United States Patent
Lombardi et al.

(10) Patent No.: US 11,110,585 B2
(45) Date of Patent: Sep. 7, 2021

(54) GRIP COMPONENT FOR A HAND TOOL

(71) Applicant: Stanley Black & Decker, Inc., Middle River, MD (US)

(72) Inventors: Keith Lombardi, Avon, CT (US); Aliaksei Chernyshou, Farmington, CT (US); Thomas Pelletier, Wallingford, CT (US); George Soria, Waterbury, CT (US); Antony Orsini, Southington, CT (US)

(73) Assignee: Stanley Black & Decker, Inc., Middle River, MD (US)

( * ) Notice: Subject to any disclaimer, the term of this patent is extended or adjusted under 35 U.S.C. 154(b) by 0 days.

(21) Appl. No.: 16/666,776

(22) Filed: Oct. 29, 2019

(65) Prior Publication Data
US 2020/0130165 A1   Apr. 30, 2020

Related U.S. Application Data

(63) Continuation-in-part of application No. 15/802,283, filed on Nov. 2, 2017, now Pat. No. 10,583,550.

(51) Int. Cl.
*B25G 1/01* (2006.01)
*B25B 23/16* (2006.01)
(Continued)

(52) U.S. Cl.
CPC ............. *B25G 1/01* (2013.01); *B25B 23/16* (2013.01); *B29C 45/1671* (2013.01);
(Continued)

(58) Field of Classification Search
CPC ..... Y10T 16/466; Y10T 16/476; Y10T 16/48; Y10T 16/498; B25G 1/102; B25G 1/02; B25G 1/01; B25G 1/10; B25G 3/36
See application file for complete search history.

(56) References Cited

U.S. PATENT DOCUMENTS 2,205,769 A * 6/1940 Sweetland ............. B62K 21/26
                                                    81/492
2,837,381 A * 6/1958 Sarlandt ................... B25G 1/10
                                                   403/263
(Continued)

FOREIGN PATENT DOCUMENTS

DE   202006005503 U1   5/2007
DE   202005021195 U1   7/2007
(Continued)

OTHER PUBLICATIONS

Extended European Search Report, Application 18203531.1 dated Mar. 15, 2019.
(Continued)

*Primary Examiner* — Chuck Y Mah
(74) *Attorney, Agent, or Firm* — Medler Ferro Woodhouse & Mills PLLC

(57) ABSTRACT

A hand tool comprising a head portion, a shaft, and a grip component is provided. The grip component and the shaft form a handle of the hand tool. The grip component is a reverse-molded component formed by: forming the external portion of the grip component by molding a first thermoplastic elastomer (TPE) material or thermoplastic urethane (TPU) material into a shell that surrounds a first cavity; after forming the external portion; placing the shaft into the first cavity; and, after the external portion is formed and the shaft is placed into the first cavity, forming the inner portion of the grip component by injecting a second TPE material or TPU material into the first cavity and onto the shaft. The first TPE or TPU material has a first level of hardness, and the second TPE or TPU material has a second level of hardness lower than the first level.

18 Claims, 30 Drawing Sheets

(51) Int. Cl.
  *B29C 45/16* (2006.01)
  *B25D 1/04* (2006.01)
  *B26B 23/00* (2006.01)
  *B29C 45/14* (2006.01)
  *B29L 31/46* (2006.01)
  *B29K 75/00* (2006.01)
  *B29K 21/00* (2006.01)
  *B25B 15/00* (2006.01)

(52) U.S. Cl.
  CPC ............... *B25B 15/00* (2013.01); *B25D 1/04* (2013.01); *B26B 23/00* (2013.01); *B29C 45/14336* (2013.01); *B29C 2045/1673* (2013.01); *B29K 2021/003* (2013.01); *B29K 2075/00* (2013.01); *B29L 2031/463* (2013.01)

(56) References Cited

U.S. PATENT DOCUMENTS

| | | | | |
|---|---|---|---|---|
| 2,871,899 | A * | 2/1959 | Coyle | B25G 1/105 81/177.1 |
| 3,173,462 | A * | 3/1965 | Koeppel | B25G 3/34 81/436 |
| 3,770,033 | A * | 11/1973 | Gavillet | B25G 1/10 81/22 |
| 4,154,273 | A * | 5/1979 | Pollak | B25D 1/04 81/20 |
| 4,739,536 | A * | 4/1988 | Bandera | B25G 1/105 16/430 |
| 5,390,572 | A * | 2/1995 | Gakhar | B25B 15/02 16/430 |
| 5,530,989 | A * | 7/1996 | Remmert | B25G 1/105 16/430 |
| 5,601,003 | A * | 2/1997 | Amtenbrink | B25G 1/105 81/177.1 |
| 5,740,586 | A * | 4/1998 | Gomas | B25G 1/10 16/430 |
| 5,944,617 | A * | 8/1999 | Falone | A63B 53/14 473/300 |
| 6,202,511 | B1 * | 3/2001 | Murray | B25G 1/01 81/20 |
| 6,311,369 | B1 * | 11/2001 | Ryu | B25G 1/01 16/430 |
| 6,368,536 | B1 * | 4/2002 | Hoepfl | B25G 1/105 264/250 |
| 6,370,986 | B1 * | 4/2002 | Scott | B25G 1/01 29/428 |
| 6,619,408 | B1 | 9/2003 | Lai | |
| 6,763,747 | B1 | 7/2004 | Gierer et al. | |
| 7,877,843 | B2 * | 2/2011 | Holland-Letz | B25G 1/105 16/436 |
| 7,996,961 | B2 * | 8/2011 | Blauer | A47J 45/06 16/431 |
| 8,499,665 | B2 * | 8/2013 | St. John | B25D 1/045 81/22 |
| 8,814,719 | B2 * | 8/2014 | Wall, Jr. | A63B 60/24 473/300 |
| 9,168,648 | B2 | 10/2015 | Lombardi | |
| 2004/0224786 | A1 | 11/2004 | Reardon | |
| 2008/0014412 | A1 * | 1/2008 | Hortnagl | B25G 1/105 428/172 |
| 2008/0276770 | A1 * | 11/2008 | Blum | B25G 1/01 81/489 |
| 2012/0222525 | A1 * | 9/2012 | Qiu | B25G 1/01 81/489 |

FOREIGN PATENT DOCUMENTS

| | | | |
|---|---|---|---|
| DE | 202007003351 U1 | 8/2007 | |
| DE | 102006061068 A1 * | 9/2007 | ............. B25G 1/102 |
| DE | 102007010972 A1 | 9/2007 | |
| DE | 102005055981 A1 | 1/2008 | |
| DE | 102006038636 A1 | 1/2008 | |
| DE | 102006037688 A1 | 3/2008 | |
| DE | 202006015466 U1 | 3/2008 | |
| DE | 102006044506 A1 | 4/2008 | |
| EP | 1923194 A1 | 5/2008 | |
| EP | 1979135 A1 | 10/2008 | |
| WO | 2007048555 A1 | 5/2007 | |
| WO | 2007079787 A1 | 7/2007 | |
| WO | 2007079979 A2 | 7/2007 | |

OTHER PUBLICATIONS

Foreign application and non-patent literature has been submitted in U.S. Appl. No. 15/802,283, to which this application claims priority.

* cited by examiner

GRIP COMPONENT FOR A HAND TOOL

CROSS-REFERENCE TO RELATED APPLICATION(S)

This application is a continuation-in-part of U.S. patent application Ser. No. 15/802,283, filed on Nov. 2, 2017 and entitled "GRIP COMPONENT FOR A HAND TOOL," the content of which is explicitly incorporated by reference herein in its entirety.

FIELD OF THE INVENTION

The present application relates to a grip component for a hand tool, and more specifically to a reverse-molded grip component in which an external portion of the grip component is molded before an inner portion of the grip component is molded.

DESCRIPTION OF THE RELATED ART

The present application relates to a hand tool used to strike another object, such as a hammer used to drive a nail. Such a hand tool may be used in construction, manufacturing, and many other applications. The hand tool may include a head portion and a handle attached to or integral with the head portion. The head portion may be made of steel and have a strike surface used to deliver an impact to the nail or other object. The hand tool may be gripped by the handle, which may be formed from wood, from a combination of steel and plastic, or from another material.

SUMMARY

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One aspect of the embodiments herein relate to a method of forming a grip component for a handle of a hand tool, the method comprising forming an external portion of the grip component by molding a first thermoplastic elastomer (TPE) material or thermoplastic urethane (TPU) material into a shell that surrounds a first cavity, wherein an external surface of the external portion is an exposed user contact surface for the grip component. The method further comprises, after forming the external portion of the grip component, forming an inner portion of the grip component by filling the first cavity with a second TPE material or TPU material, wherein the second TPE material or TPU material is molded to have a second cavity for receiving a shaft of the hand tool, and wherein the first TPE material or TPU material has a first level of hardness and wherein the second TPE or TPU material has a second level of hardness that is lower than the first level of hardness.

In an embodiment, the method further comprises forming the handle of the hand tool by: sliding the grip component onto the shaft via the second cavity in the grip component, and attaching the grip component to the shaft via at least a mechanical fastener In an embodiment, when the grip component is slid onto the shaft, the inner portion of the grip component and the shaft have no adhesive therebetween.

In an embodiment, when the grip component is slid onto the shaft, the inner portion of the grip component and the shaft have only an adhesive with a lap shear strength of less than or equal to 500 therebetween.

In an embodiment, the above adhesive is in a liquid form or a gel form (or otherwise uncured form) when the grip component is being slid onto the shaft.

In an embodiment, the mechanical fastener includes an endcap adapted to be pressed against an end of the grip component, and includes at least one of a screw, nut, and rivet adapted to attach the endcap to the shaft.

In an embodiment, the end of the shaft forms a threaded portion that protrudes from the grip component after the grip component is slid onto the shaft, and the threaded portion is adapted to be attached to the nut or to the screw.

In an embodiment, the grip component is attached to the shaft without compressing of the grip component around the shaft in a radially inward direction.

In an embodiment, the grip component is formed via injection molding of the first TPE or TPU material to form a first layer and injection molding of the second TPE or TPU material to form a second layer in contact with and chemically or mechanically bonded to the first layer, wherein the grip component is formed with only the first layer and the second layer, such that the grip component is a two-layer grip component.

In an embodiment, the second TPE material or TPU material has a durometer that is less than or equal to shore A-40.

In an embodiment, the second TPE material or TPU material has a durometer that is less than or equal to shore A-30.

In an embodiment, the second TPE material or TPU material has a durometer that is less than or equal to shore A-20.

In an embodiment, the second TPE material or TPU material has a durometer that is in a range of between shore A-20 and shore A-30.

In an embodiment, the second TPE material or TPU material has a durometer that is between shore 00-10 and shore 00-30.

In an embodiment, the second TPE material or TPU material has a durometer that is substantially shore 00-20.

In an embodiment, the thickness of the inner portion is at least twice that of the external portion.

In an embodiment, the thickness of the inner portion is less than half that of the external portion.

In an embodiment, a portion of the shaft onto which the grip component is slid has a curved shape.

In an embodiment, when the grip component has not been slid onto the shaft, the second cavity has a substantially straight shape, and a portion of the shaft onto which the grip component is to be slid has a curved shape.

In an embodiment, after the handle is formed, the external portion forms an entire external surface of the grip component, such that none of the second TPE or TPU material of the inner portion is exposed at a side of the grip component.

One aspect of the embodiments herein relates to a hand tool comprising a head portion, a shaft, and a grip component. The head portion is disposed at a first end of the hand tool. The shaft is attached to or integral with the head portion and extending toward a second and opposite end of the hand tool. The grip component is disposed around the shaft at the second end of the hand tool, wherein the grip component and the shaft form a handle of the hand tool. The grip component comprises an external portion molded from a first thermoplastic elastomer (TPE) material or thermoplastic urethane (TPU) material, and an inner portion molded from a second TPE material or TPU material, wherein the first TPE or TPU material has a first level of hardness, and the second TPE or TPU material has a second level of hardness lower than the first level of hardness. The inner portion of the grip component is disposed around the shaft, and the external portion of the grip component forms a shell around the inner portion and is an exposed user contact surface for the grip component. The grip component is attached to the shaft via at least a mechanical fastener.

In an embodiment, the hand tool is a hammer, and the head portion is a hammer head.

In an embodiment, the mechanical fastener includes an endcap adapted to be pressed against an end of the grip component, and includes at least one of a screw, nut, and rivet adapted to attach the endcap to the shaft.

In an embodiment, the inner portion of the grip component and the shaft have no adhesive therebetween.

In an embodiment, the inner portion of the grip component and the shaft have only an adhesive with a lap shear strength of less than or equal to 500 lb/in$^2$ therebetween.

In an embodiment, the end of the shaft forms a threaded portion that protrudes from the grip component, and the threaded portion is adapted to be attached to the nut or to the screw.

In an embodiment, the grip component is formed with only the external portion and the inner portion, such that the grip component is a two-layer grip, wherein the external portion is formed via injection molding of the first TPE or TPU material into a first layer, and the inner portion is formed via injection molding of the second TPE or TPU material into a second layer chemically or mechanically bonded to the first layer.

In an embodiment, the hand tool further comprises a collar fitted around one end of the grip component, wherein the collar and the endcap are disposed at opposite ends of the grip component.

In an embodiment, at least a portion of the shaft within the inner portion of the grip component has a curved shape.

In an embodiment, the external portion is an injection molded first layer, the inner portion is an injection molded second layer in contact with and chemically or mechanically bonded to the first layer, and the grip component is formed with only the first layer and the second layer, such that the grip component is a two-layer grip component.

One aspect of the embodiments herein relates to a hand tool, comprising a head portion disposed at a first end of the hand tool; a shaft attached to or integral with the head portion and extending toward a second and opposite end of the hand tool; and a grip component. The grip component is disposed around the shaft at the second end of the hand tool and has an external portion and an inner portion, wherein the grip component and the shaft form a handle of the hand tool. The grip component is a reverse-molded component formed by: forming the external portion of the grip component by molding a first thermoplastic elastomer (TPE) material or thermoplastic urethane (TPU) material into a shell that surrounds a first cavity; placing the shaft into the first cavity; and after the external portion is formed and after the shaft is placed into the first cavity surrounded by the shell, forming the inner portion of the grip component by injecting a second TPE material or TPU material into the first cavity and around the shaft. The first TPE or TPU material has a first level of hardness, and the second TPE or TPU material has a second level of hardness lower than the first level of hardness. The inner portion of the grip component is disposed around the shaft, and the external portion of the grip component forms a shell around the inner portion.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not necessarily to scale.

DETAILED DESCRIPTION

Figure 1A:
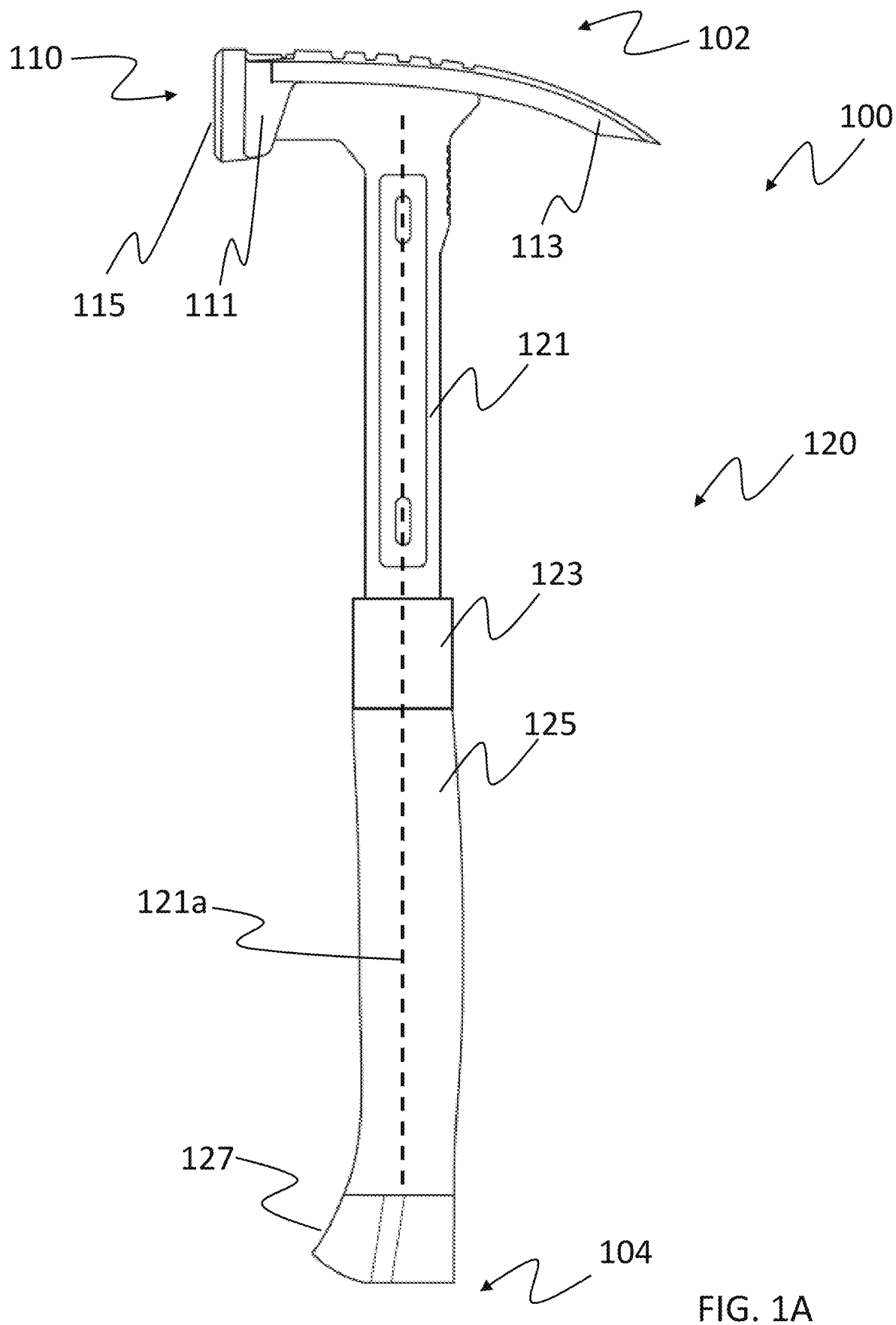
FIG. 1A is a side view of a hand tool, according to an embodiment hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments herein relate to a grip component for a handle of a hand tool (e.g., a hammer or hatchet or screwdriver), in which the grip component has at least a molded external portion and a molded inner portion, and in which the molded inner portion is formed after the molded external portion has been formed. Such a grip component may be referred to as a reverse-molded grip component, because the process for making such a grip component may be the reverse of a process in which an inner portion of a grip component is formed before the external portion. In the latter process, a grip component may be formed by injection molding, e.g., a melted first thermoplastic elastomer (TPE) material to form the inner portion, and then, after the inner portion is formed, injection molding a melted second TPE material to flow around the inner portion, wherein the melted second TPE material then cools to form an external portion of the grip component. As the melted second TPE material cools, it may try to contract in an inward direction, and may thus squeeze or otherwise exert pressure on the inner portion. This pressure has the potential to undesirably deform the inner portion, especially if the TPE material of the inner portion is too soft and/or the TPE material of the external portion is harder than that of the inner portion (as measured once the materials have cooled). To avoid being deformed by this pressure, the inner portion for such a process may have a hardness level of at least shore A-40 (e.g. at least shore A-60 in some embodiments) to resist the pressure of the external portion as the external portion cools from a melted state and tries to contract. This level of hardness for the inner portion may, however, limit its ability to perform vibration isolation or other forms of shock absorption for the hand tool.

Compared to a grip component formed from the process described above, the reverse-molded grip component of embodiments herein may improve vibration isolation and/or simplify assembly of a hand tool. More specifically, embodiments herein relate to a grip component in which, e.g., an external portion is formed first in time by injection molding a first TPE or thermoplastic urethane (TPU) material and allowing the material to cool. The external portion may be formed to have a cavity. After the external portion has been formed, a second TPE or TPU material may be injection molded into the cavity to form the inner portion. This process allows the inner portion to be formed after the first TPE or TPU material of the external portion has already cooled. As a result, the inner portion does not experience, nor need to resist, any contracting pressure from the external portion. Such a condition allows softer materials to be used for the inner portion. For instance, the second TPE or TPU material used in such a reverse molding process may have a hardness level that is less than or equal to shore A-30 or shore A-20, or less than or equal to shore 00-20. The use of the softer material for the inner portion may improve vibration isolation or other forms of shock absorption, which may provide a smoother use of the hand tool and decrease user fatigue.

In an embodiment, the reverse-molded grip component may simplify assembly of a hand tool by being attached to a shaft of the hand tool without the use of an adhesive, or with the use of only a light adhesive (e.g., glue or epoxy) in which the light adhesive may still be uncured when the grip component is being slid onto a shaft. More specifically, the hand tool may have a handle that is formed by sliding the grip component onto a shaft (also referred to as a handle core) of the hand tool, via a cavity surrounded by the inner portion. A more complicated process for attaching the grip component to the shaft for forming the handle may involve applying a pre-adhesive (e.g., an adhesive promoter, such as a primer) to the shaft, then applying a strong adhesive to the shaft, followed by sliding the grip component onto the shaft, and then curing the strong adhesive. In some instances, the process may have to wait for the pre-adhesive to dry before applying the strong adhesive thereon, and before sliding the grip component onto the shaft. Further, while the strong adhesive is being cured in such a process, the grip component may be compressed inwardly by a fixture (e.g., vice grip) along a radial axis of the grip component (i.e., in a radially inward direction). The compression may be used to improve the fit of the shaft within the cavity, and to increase contact between the inner portion of the grip component and the shaft, so as to provide more surface area for the strong adhesive to bond. The above process may, however, increase the time and cost of assembling the hand tool.

The reverse-molded grip component of the embodiments herein may be suitable for eliminating or reducing some of the above steps, because the softer inner portion of the grip component may already provide a good fit of the shaft within the cavity formed by the inner portion, even without compressing the grip component along a radial axis thereof or without the use of a strong adhesive. That is, the soft material of the inner portion may better conform to a shape of the shaft, so as to provide a tight fit around the shaft. As a result, the grip component may rely on a mechanical fastener, rather than a pre-adhesive (e.g., a dried pre-adhesive) and strong adhesive, to attach the grip component to the shaft. Further, the use of the pre-adhesive, the strong adhesive, and the compression of the grip component may create a rigid attachment between the grip component and the shaft. Such a rigid attachment may reduce a vibration isolation capability of the grip component. By eliminating the use of the pre-adhesive, strong adhesive, and/or the compression step, the attachment between the grip component and the shaft may be looser (e.g., more elastic), which may further improve the grip component's vibration isolation capability. In an embodiment, a light adhesive may still be used primarily as a lubricant when the grip component is being slid onto the shaft, though the light adhesive may also help attach the grip component to the shaft. In an embodiment, the light adhesive may be in a liquid or gel form when the grip component is being slid on to the shaft. If the light adhesive were being relied upon as a primary way of attaching the grip component to the shaft, the light adhesive may have to be dried on the shaft before the grip component is slid thereon, in order to achieve a strong bond between the shaft and the grip component. However, because the primary purpose of the light adhesive in the embodiments herein is to provide lubrication rather than to attach the shaft to the grip component, it may be unnecessary to wait for the light adhesive to dry before sliding the grip component onto the shaft. In fact, by sliding the grip component on the shaft while the light adhesive is still in liquid or gel form, the light adhesive may be better able to provide lubrication in such a form. In an embodiment, the light adhesive may have a long work time and/or long dry time so as to better ensure that it stays in the liquid or gel form until the grip component has been slid onto the shaft. In an embodiment, no adhesive other than the light adhesive is between the grip component and the shaft.

In an embodiment, an external portion and an inner portion of a grip component may be formed, and then the grip component may be slid onto a shaft of the hand tool. In an embodiment, the grip component may be formed directly on the shaft. For instance, the inner portion of the grip component may be overmolded on the shaft, by causing a melted material for the inner portion to flow on and cover the shaft. Such techniques for forming the grip component are discussed below in more detail.

Figure 1B:
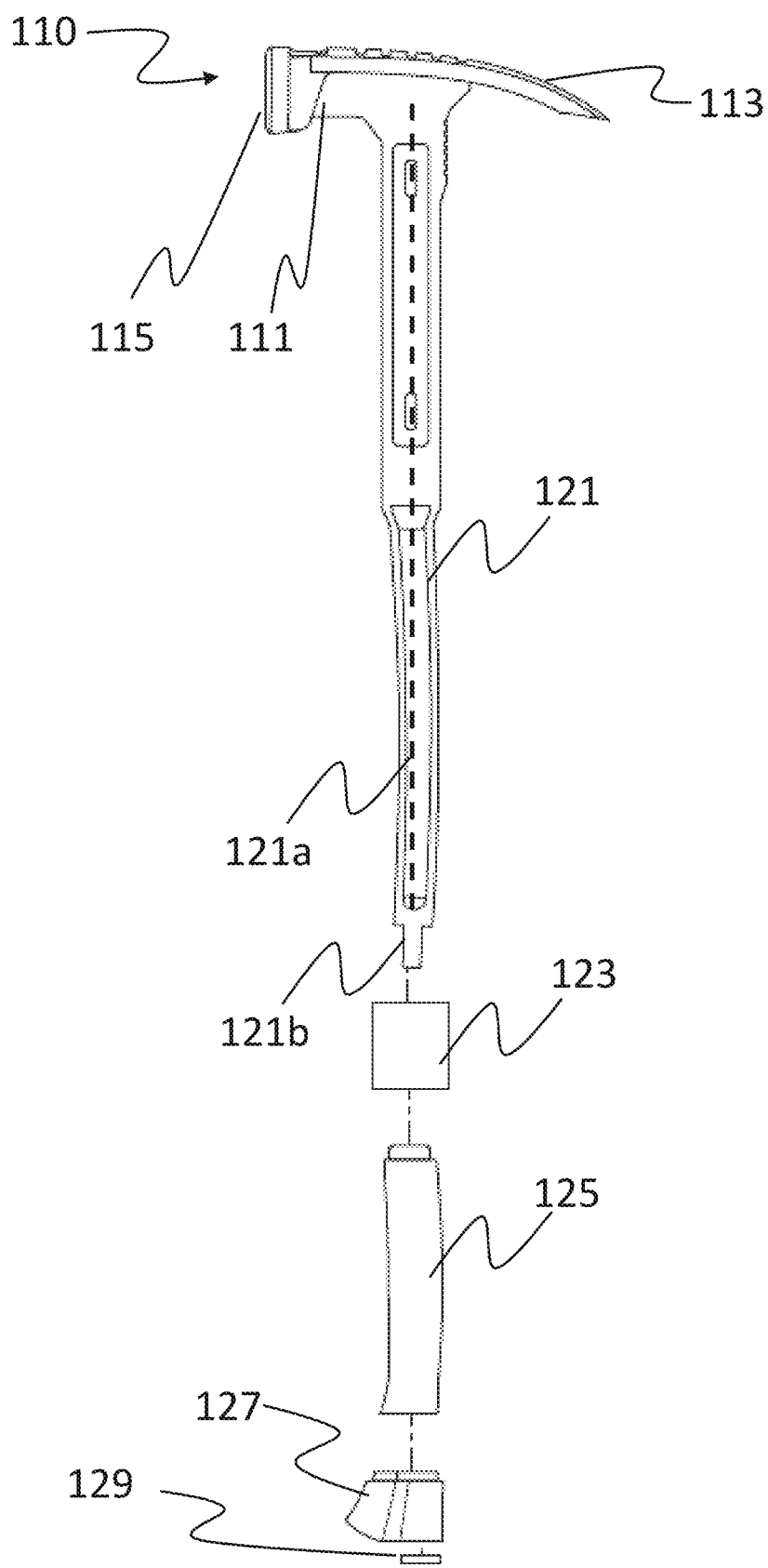
FIG. 1B is an exploded side view of a hand tool, according to an embodiment hereof.

FIGS. 1A and 1B illustrate an embodiment of a hand tool 100 that is a hammer (e.g., a 14 oz. or 32 oz. framing hammer), though other embodiments may involve a hand tool that is a hatchet or other type of hand tool. The hand tool 100 includes a head portion 110 (e.g., a hammer head) and a handle 120. The head portion 110 may be used to strike a nail or other object, and may be located at a first end 102 (e.g., an upper end) of the hand tool 100, while the handle 120 may extend between the head portion 110 and a second, opposite end 104 (e.g., bottom end) of the hand tool 100.

In an embodiment, the head portion 110 may include a bell portion 111 at one end of the head portion 110, and include a claw portion 113 (e.g., a rip-type or claw-type) at the opposite end of the head portion 110. The bell portion 111 may have a strike surface 115 for striking the nail or other object. In an embodiment, the strike surface 115 may have a "waffle" pattern machined into or otherwise formed on the strike surface 115. The structure and the material for the head portion 110 are described in more detail in U.S. Patent Application Publication No. 2014/0001426, entitled "Hammer," to Lombardi et al., the entire content of which is incorporated herein by reference.

Figure 1C:
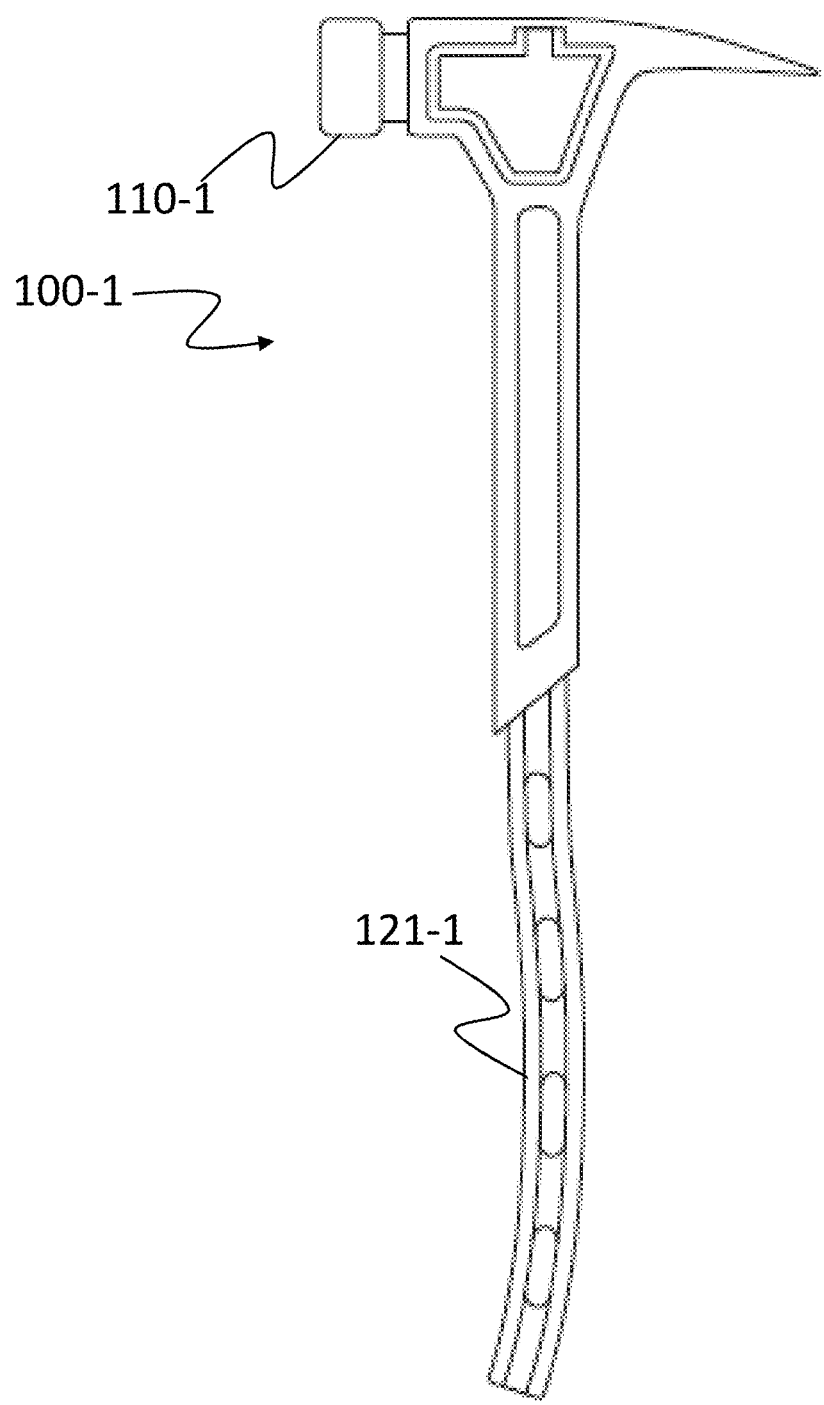
FIG. 1C is a side view of a shaft for a handle of a hand tool, according to an embodiment hereof.

In an embodiment, the handle 120 may include a collar 123, a grip component 125, an endcap 127, and a shaft 121 that extends toward the second end 104 of the hand tool 100. The shaft 121 may be integrally formed with the head portion 110 (so that the shaft 121 and head portion 110 are part of a single piece) or may be formed separately from the head portion 110 and attached thereto (e.g., via a weld connection). The shaft 121 may be formed from, e.g., a steel alloy, and may be referred to as a handle core. The structure and material of the shaft 121 is also described in more detail in U.S. Patent Application Publication No. 2014/0001426, the entire content of which is incorporated herein by reference. The shaft 121 may be elongated in shape, and may be substantially straight along a longitudinal axis 121a thereof, or may have a curved shape along the longitudinal axis 121a. For instance, FIG. 1C illustrates an embodiment in which a hand tool 100-1 has a shaft 121-1 with a curved shape at an end of the shaft 121-1 that is opposite to a head portion 110-1 of the hand tool 100-1. Returning to FIGS. 1A and 1B, the shaft 121 may, in an embodiment, have a threaded portion 121b (FIG. 1B) at an end of the shaft 121, opposite to the head portion 110 of the hand tool 100. This end of the shaft 121 may also be the second end 104 of the hand tool 100. In the embodiment of FIG. 1B, the threaded portion 121b may have threads on an external surface thereof, and may be adapted to be attached to the endcap 127 and a nut 129. In another embodiment, the threaded portion 121b may be a threaded post that has threads on an inner surface thereof, and may be adapted to be attached to an endcap and a screw. The threaded portion 121b, endcap 127, and nut 129 (or screw) provide an example of a mechanical fastener for attaching the shaft 121 to the grip component 125, as discussed in more detail below.

In the embodiment of FIGS. 1A and 1B, the collar 123, grip component 125, and the endcap 127 may be slid onto at least a portion of the shaft 121 to form the handle 120. The sliding of the collar 123, grip component 125, and endcap 127 onto the shaft 121 may entail the collar 123, grip component 125, and/or endcap 127 being moved, or may entail the shaft 121 being moved (e.g., being inserted into the collar 123, grip component 125, and endcap 127). In an embodiment, the collar 123, grip component 125, and endcap 127 may be separate components, as illustrated in FIGS. 1A and 1B. In another embodiment, the grip component 125 may be overmolded on the collar 123 or the endcap 127, so as to form an integral component therewith. For instance, the collar 123 or the endcap 127 may be placed into a mold that forms the grip component 125, so that the grip component 125 is overmolded on the collar 123 or the endcap 127.

Figure 2A:
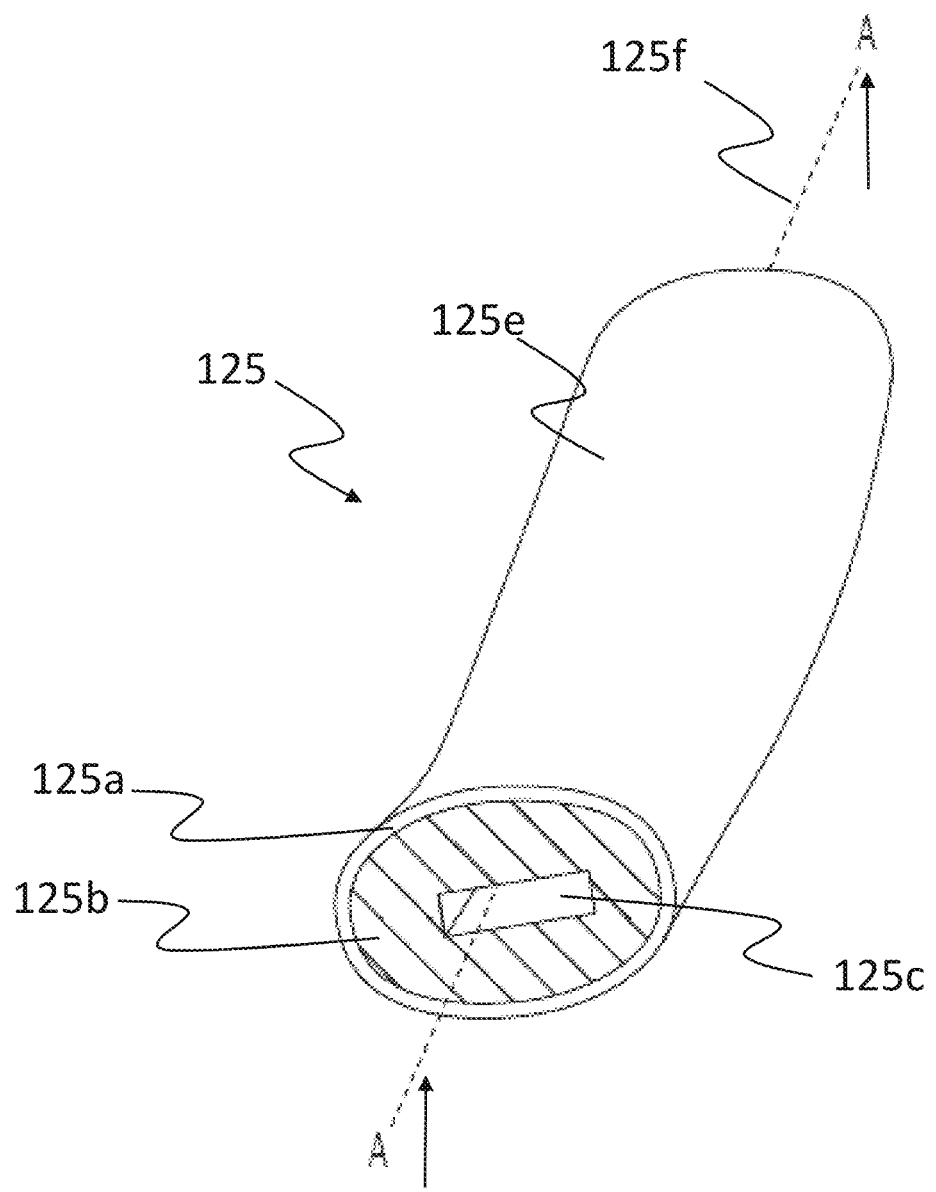
FIG. 2A is a perspective view of a grip component for a handle of a hand tool, according to an embodiment hereof.
Figure 2B:
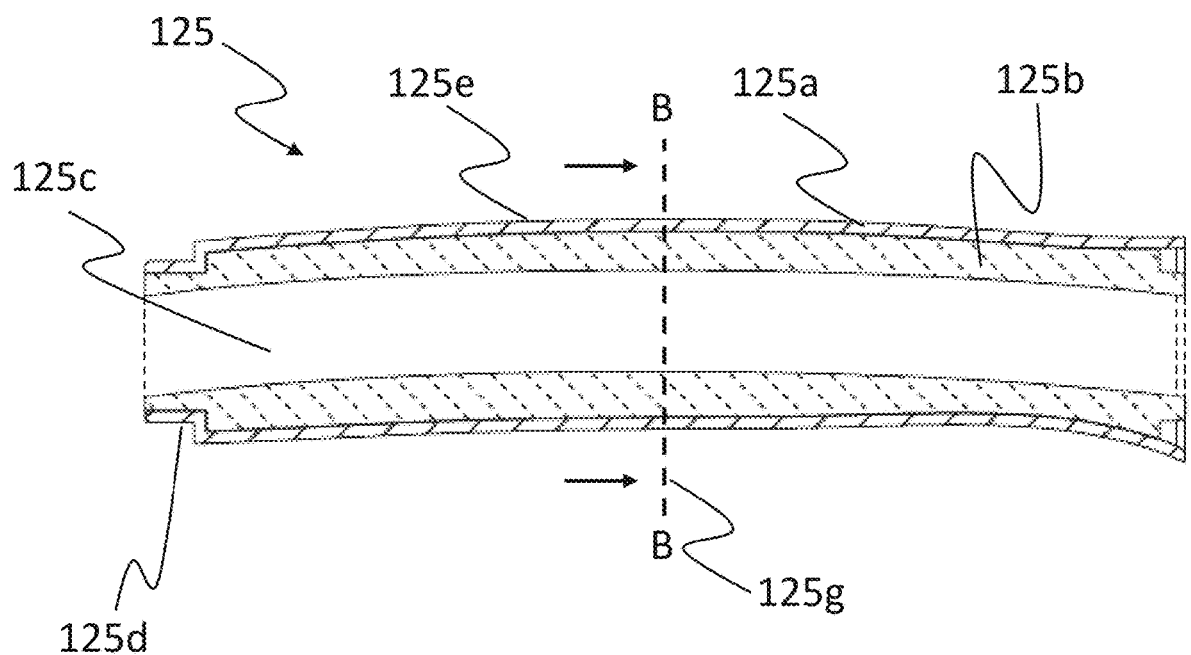
FIG. 2B is a sectional view of a grip component for a handle of a hand tool, according to an embodiment hereof.

FIGS. 2A and 2B illustrate a perspective view and a sectional view, respectively, of an embodiment of the grip component 125 that includes an external portion 125a and an inner portion 125b. The sectional view of FIG. 2B cuts along the line A-A, which may also be a longitudinal axis 125f of the grip component 125, and is a view that is in a direction indicated by the arrows in FIG. 2A. In an embodiment, the external portion 125a forms a shell around the inner portion 125b. In an embodiment, the external portion 125a may form a first layer that is an external layer (also referred to as outer layer) of the grip component 125, and the inner portion 125b may form a second layer that is an inner layer of the grip component 125. In an embodiment, the grip component 125 may be a two-layer grip that includes only the first layer (formed by the external portion 125a) and the second layer (formed by the inner portion 125b). In such an embodiment, the external portion 125a provides an exposed user contact surface (e.g., grip surface) for the grip component 125. In other words, in such an embodiment, an external surface 125e of the external portion 125a is a surface that contacts a user when the handle 120 is being gripped. Further, the first layer formed by the external portion and the second layer formed by the inner portion may be in contact with and chemically or mechanically bonded to each other (if there is only an adhesive between the two portions to chemically bond them, they may still considered to be in contact). In an embodiment, the external portion 125a forms an entire external surface of the grip component 125, such that none of the material of the inner portion 125b is exposed to an external environment at a side of the grip component 125. For instance, the external portion 125a may be free of holes or gaps on its external surface.

In an embodiment, both the external portion 125a and the inner portion 125b may be formed from a thermoplastic elastomer (TPE) or thermoplastic urethane (TPU) material. The TPE and TPU material may also be referred to as a thermoplastic rubber (TPR) material. In a more specific implementation, the external portion 125a may be formed by injection molding a first TPE or TPU material, and the inner portion may then be formed by injection molding a second, different TPE or TPU material inside a cavity formed by the external portion 125a, as discussed in more detail below. In an embodiment, the first TPE or TPU material of the external portion 125a may have a higher level of hardness (e.g., a durometer in a range of shore A-60 to shore A-70) than that of the inner portion 125b. The higher level of hardness may enhance durability of the grip component 125 against external wear. In an embodiment, the first TPE or TPU material for the external portion 125a may include an additive material that provides abrasion resistance, a material that provides protection against UV radiation (e.g., a UV stabilizer) or other forms of photodegradation, and/or a material that provides protection against certain chemicals.

In an embodiment, the second TPE or TPU material of the inner portion 125b may have a level of hardness that is less than or equal to a durometer of shore A-60 (e.g., less than or equal to shore A-40 in some embodiments). It may be appreciated that the level of hardness may be as measured when the material is not in a melted state. In an embodiment, the second TPE or TPU material may have a level of hardness that is less than or equal to a durometer of shore A-30 or shore A-20. In other examples, the second TPE or TPU material may have a durometer that is in a range of shore A-20 to shore A-30, or a durometer in a range of shore 00-10 to shore 00-30 (e.g., a value of shore 00-20). As discussed above, the low durometer values for the second TPE or TPU material of the inner portion 125b may serve to isolate an external surface of the grip component 125 from vibration or other movement of the shaft 121. In an embodiment, the use of a TPE or TPU material for the external portion 125a may also contribute to the vibration isolation capability of the grip component 125.

In an embodiment, the inner portion 125b may have a greater thickness than that of the external portion 125a. For instance, the inner portion 125b may be at least twice as thick as the external portion 125a. In an embodiment, the inner portion 125b may have a lower thickness than that of the external portion 125a. For instance, the inner portion 125b may be at most half as thick as the external portion 125a. The ratio of the thickness of the inner portion 125b to that of the external portion 125a may be based on a balance between durability provided by the external portion 125a and shock absorption provided by the inner portion 125b, as well as a balance between the cost of the first TPE or TPU material and the cost of the second TPE or TPU material (and any additives materials thereof).

As illustrated in FIG. 1B and FIG. 2B, the external portion 125a may be formed to have a neck portion 125d, in which the external portion 125a narrows along a radial axis 125g (also referred to as a width axis) that is perpendicular to the longitudinal axis 125f of the grip component. The neck portion 125d may be fitted within a recessed portion of the collar 123, which is discussed below in more detail. In another embodiment, the external portion 125a may be overmolded on the collar 123, such that the external portion 125a surrounds the collar 123. In such an embodiment, the neck portion 125d may be omitted from the grip component 125.

FIG. 2B further illustrates that the inner portion 125b may be formed to have a cavity 125c for sliding the grip component onto the shaft 121 of the hand tool 100. When the grip component 125 has not yet been slid onto the shaft 121, the cavity 125c can have a shape that is substantially straight along the longitudinal axis 125f of the grip component 125, or may have a curved shape along the longitudinal axis 125f. Further, when the grip component 125 has not yet been slid onto the shaft 121, the cavity 125c may have a shape that is substantially the same as at least a portion of the shaft 121. Having the same shape may allow the shaft 121 to more easily pass through the cavity 125c during the sliding step, and may facilitate better contact between the inner portion 125b and the shaft 121 after the grip component 125 is slid thereon. In other instances, however, when the grip component 125 is not yet slid on the shaft 121, the cavity 125c may have a shape that is different than a shape of the shaft 121 (or, more specifically, different than a shape of a portion of the shaft 121 onto which the grip component 125 will be slid). For instance, the shaft 121 may have a portion with a curved shape along a longitudinal axis 121a thereof, while the cavity 125c of the grip component 125 may be substantially straight along a longitudinal axis 125f thereof. Such a shape for the cavity 125c may be simpler to achieve. Further, the inner portion 125b that surrounds the cavity 125c may be sufficiently soft (e.g., with a durometer of shore A-20) to accommodate the shaft 121, even if the shaft 121 has a curved shape. For instance, after the grip component 125 is slid onto the shaft 121, the second TPE or TPU material of the inner portion 125b may be sufficiently soft such that it conforms to the shape of the shaft 121, so as to provide a fit around the shaft 121. As also discussed in more detail below, the handle 120 may be formed while using only a light adhesive between the shaft 121 and the inner portion 125b, or without the use of any adhesive. If the light adhesive is used, it may remain uncured (e.g., in a liquid form or gel form) during formation of the handle 120.

Figure 3A:
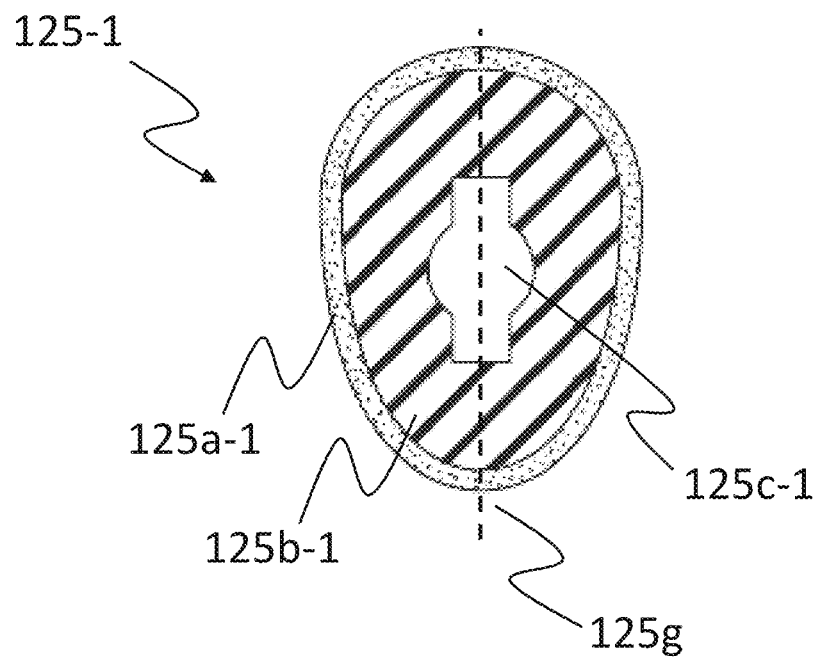
FIGS. 3A and 3B are sectional views of grip components for a handle of a hand tool, according to an embodiment hereof.
Figure 3B:
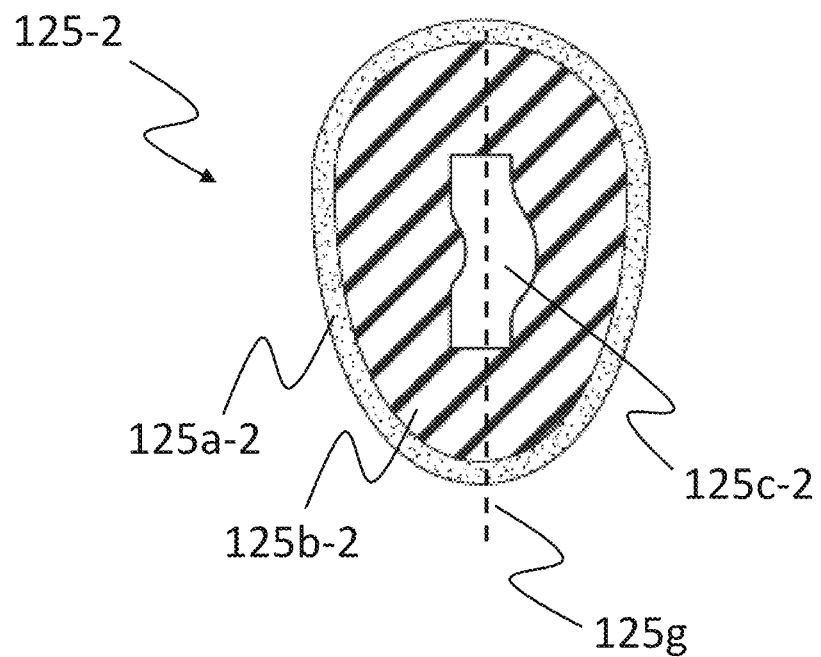

In an embodiment, the cavity 125c may have a shape, as viewed from a cross section that cuts along the line B-B (which may be the radial axis 125g of the grip component 125), that is rectangular. In other words, the cavity 125c may have a rectangular cross section along the radial axis 125g of the grip component 125. FIGS. 3A and 3B illustrate other shapes for the cross section of such a cavity. More specifically, FIG. 3A illustrates a cavity 125c-1 for a grip component 125-1 whose cross-section, cutting along the line B-B and in the direction indicated by the arrows in FIG. 2B, has a shape that curves outward in two opposite directions, and may be symmetrical with respect to the axis 125g. FIG. 3B illustrates a cavity 125c-2 for a grip component 125-2 whose cross section, cutting along the line B-B, has a shape that curves in only one direction, such that it is asymmetrical with respect to axis 125g. In other words, the cavities 125c-1 and 125c-2 may have curved cross sections along a radial axis of the respective grip component 125-1, 125-2. In an embodiment, the grip components 125-1 and 125-2 of FIGS. 3A and 3B may be slid onto respective shafts with substantially the same cross sectional shapes, as discussed in more detail below, such as in the discussion of FIG. 7A.

Figure 4:
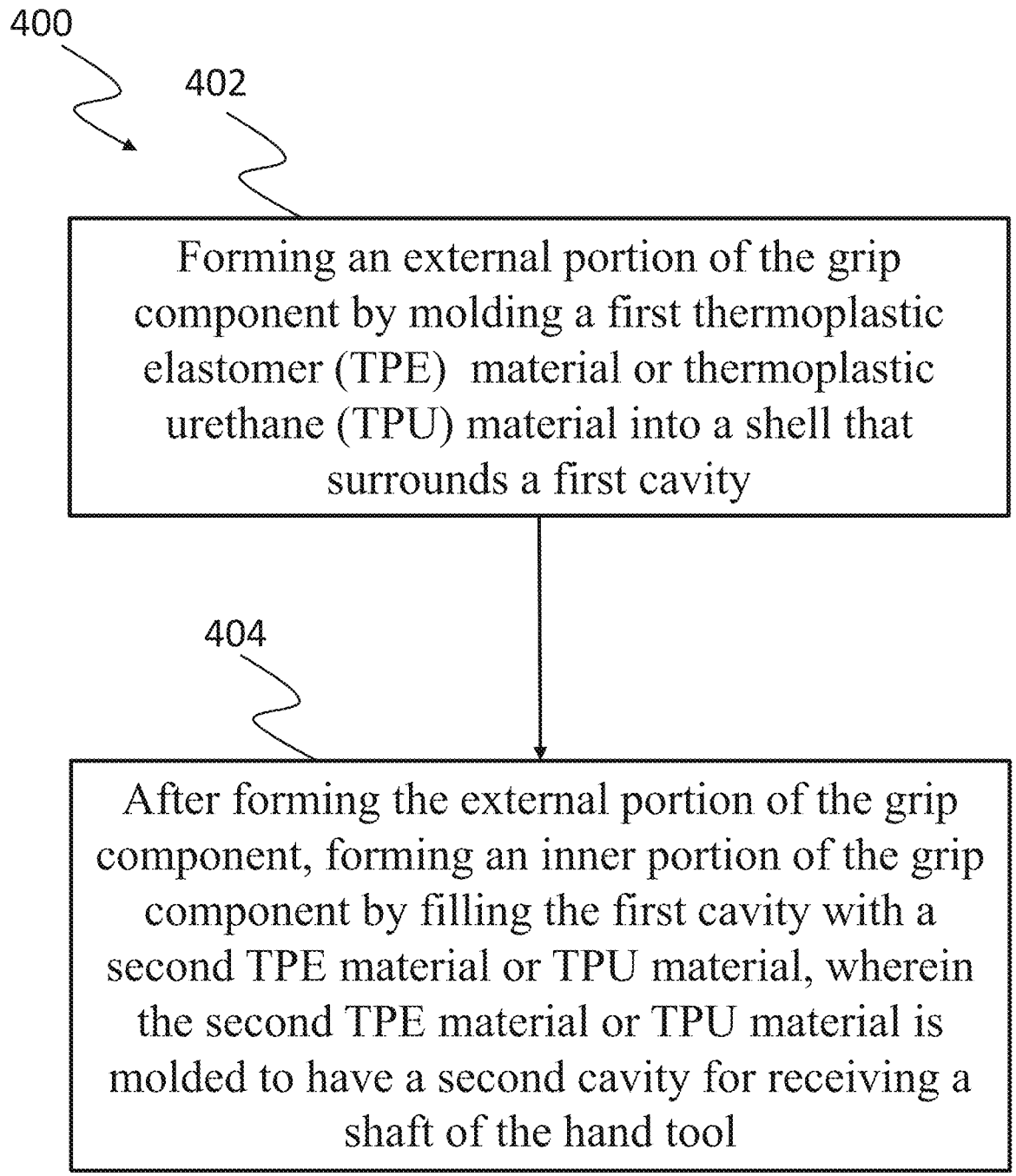
FIG. 4 provides a flow diagram that illustrates example steps of a method for making a grip component for a handle of a hand tool, according to an embodiment hereof.

FIG. 4 illustrates an example method 400 for forming the grip component 125 of the hand tool 100. Generally speaking, the method 400 involves a reverse molding technique in which the external portion 125a is formed before the inner portion 125b is formed. As discussed above, the reverse molding technique may allow the inner portion 125b to have greater softness compared with other manufacturing techniques, while limiting the risk of undesirable deformation to the inner portion 125b. The soft inner portion 125b may improve vibration isolation for the grip component 125, and may simplify assembly of the hand tool 100.

Figure 5A:
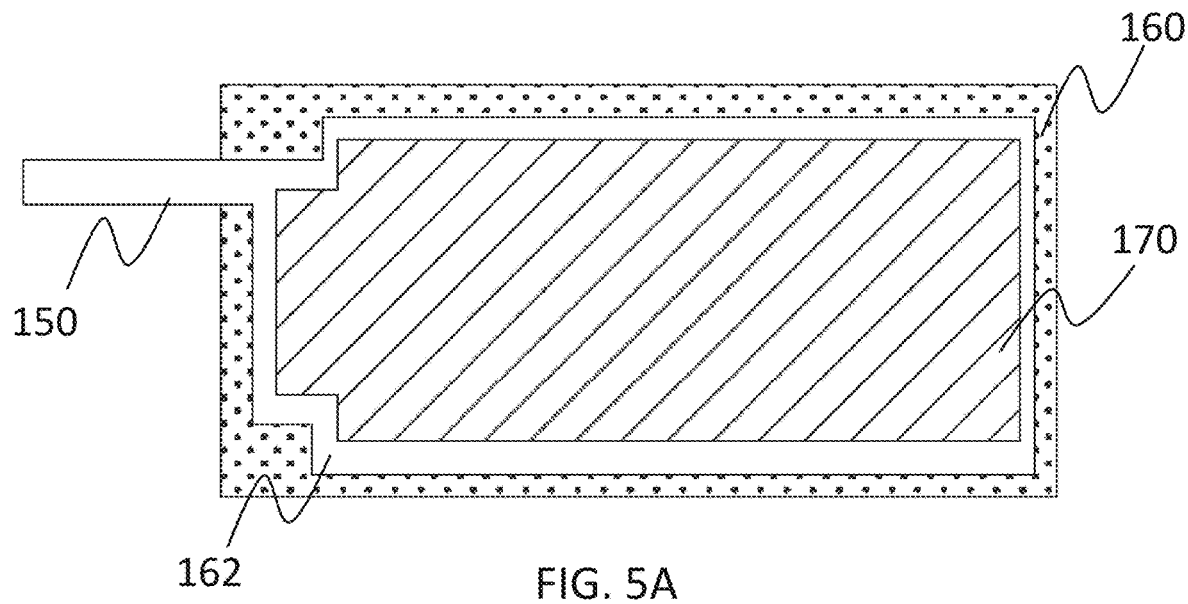
FIG. 5A illustrates a mold for injection molding of an external portion of a grip component, according to an embodiment hereof.
Figure 5B:
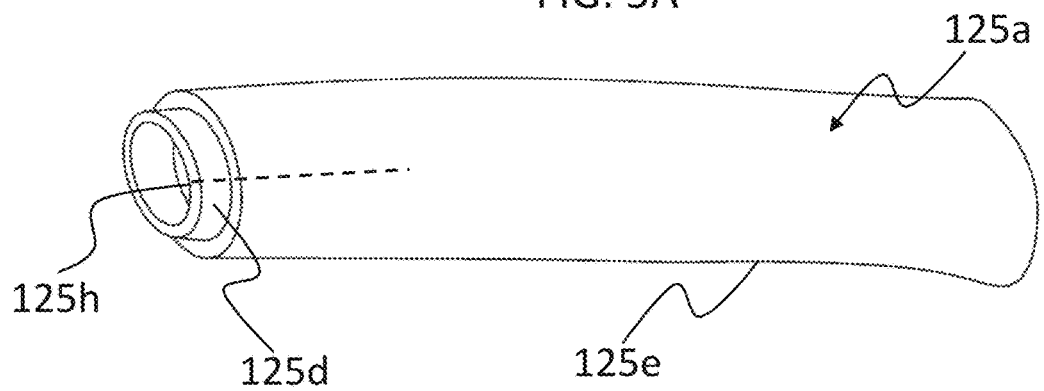
FIG. 5B is a perspective view of an external portion of a grip component, according to an embodiment hereof.
Figure 5C:
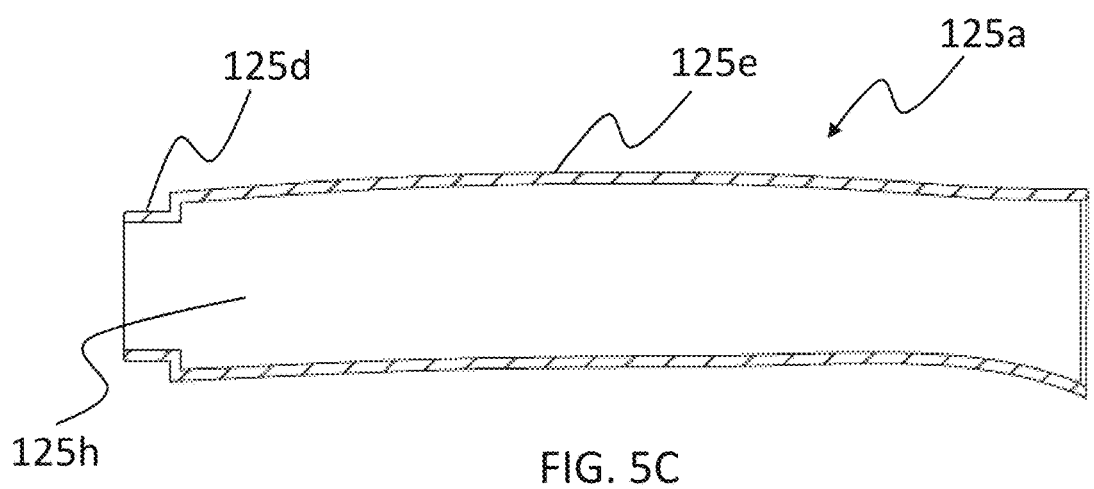
FIG. 5C is a sectional view of an external portion of a grip component, according to an embodiment hereof.

In an embodiment, the method 400 begins at step 402, in which the external portion 125a of the grip component 125 is formed by molding a first thermoplastic elastomer (TPE) or thermoplastic urethane (TPU) material into a shell that surrounds a first cavity. For instance, FIG. 5A illustrates an example of step 402, in which the external portion 125a of the grip component 125 is formed by injection molding the first TPE or TPU material into a mold 160. In a more specific example, a single shot of the first TPE or TPU material may be melted and forced into the mold 160 through an inlet 150 (e.g., a runner or sprue). The mold 160 may include a mold core 170 around which the melted first TPE or TPU material flows to form a shell that surrounds a cavity, such as the first cavity 125h, which is illustrated in FIG. 5B. The shape and thickness of the shell may be defined by a mold cavity 162 between the mold core 170 and an inner surface of the mold 160. In the example of FIGS. 5A-5C, the mold cavity 162 between mold core 170 and the inner surface of the mold 160 may have a shape that causes the external portion 125a to have the neck portion 125d. The neck portion 125d may be fitted into the collar 123, as discussed below. In another embodiment, the collar 123 or endcap 127 may be placed in the core 160, such that the melted first TPE or TPU material flows around the collar 123 or endcap 127, and the external portion 125a is overmolded on the collar 123 or on the endcap 127 of FIGS. 1A and 1B. In an embodiment, the external surface 125e of the external portion 125a is an exposed user contact surface (e.g., a grip surface) for the grip component 125.

Figure 6A:
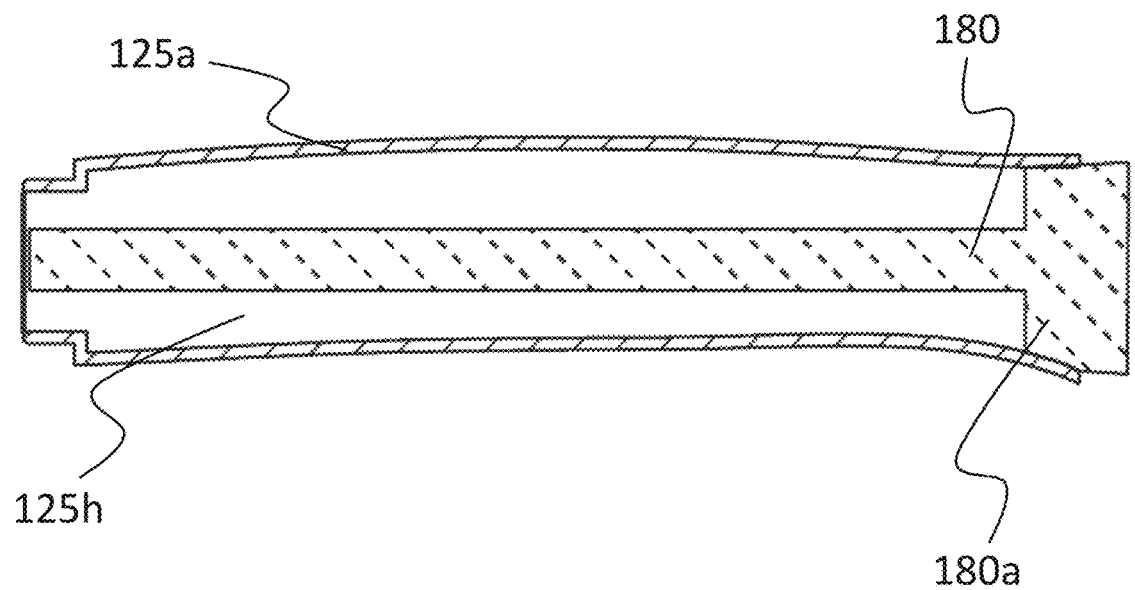
FIG. 6A illustrates a mold core for injection molding of an inner portion of a grip component within a cavity formed by the external portion of the grip component, according to an embodiment hereof.

Returning to FIG. 4, the method 400 further includes a step 404 that is performed after step 402. In some instances, step 404 is performed after the first TPE or TPU material has cooled to a solid form. In step 404, the inner portion 125b of the grip component 125 is formed by filling a portion of the first cavity 125h with a second TPE or TPU material. The second TPE or TPU material may be molded to have a second cavity that is the cavity 125c, which may be used to receive the shaft 121. For instance, FIG. 6A illustrates an example of step 404, in which a mold core 180 is placed in the first cavity 125h. The core 180 may be may have a shape that is substantially straight so as to form a substantially straight second cavity 125c, or may have a curved shape so as to form a curved second cavity 125c. In an embodiment, the core 180 may have a shape and size that is substantially the same as at least a portion of the shaft 121 onto which the grip component 125 will be slid. In another embodiment, the core 180 may have a different shape and size than that of the shaft 121. Such a core 180 may cause the second cavity 125c to have a different shape than the shaft 121, but the inner portion 125b that surrounds the cavity 125c may be sufficiently soft to still accommodate the shaft 121, as discussed above. In an embodiment, which is discussed in more detail with respect to FIGS. 10A-10F, the shaft (e.g., 121) of the hand tool (instead of the mold core 180a) may be placed in the first cavity 125h. In such an embodiment, the inner portion 125b of the grip component 125 may be formed directly on the shaft 121.

Figure 6B:
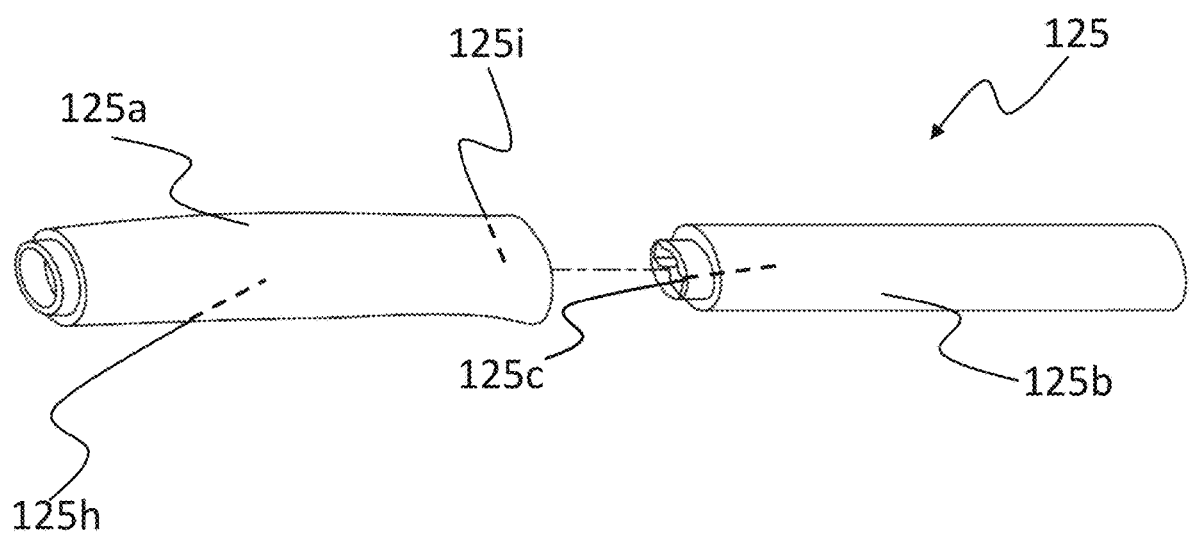
FIG. 6B is an exploded perspective view of an external portion and an inner portion of a grip component, according to an embodiment hereof.

In the example of FIG. 6A, a single shot of the second TPE or TPU material may be melted and injection molded into a portion of the first cavity 125h. The melted second TPE or TPU material may fill the portion of the first cavity 125h between the core 180 and an inner surface of the external portion 125a. In a second example in which the shaft 121 (instead of the mold core 180a) is placed in the first cavity 125h, the melted second TPE or TPU material may fill the portion of the first cavity 125h between the shaft 121 and an inner surface of the external portion 125a. Returning to the example of FIG. 6A, after the second TPE or TPU material cools to a solid (or even a gel) form, the core 180 may be removed, leaving the inner portion 125b illustrated in FIG. 6B in the first cavity 125h. The space previously occupied by the core 180 may become the second cavity 125c. In an embodiment, a portion 180a the core 180 may occupy a space that will later become a recessed portion 125i at an end the grip component 125, the recessed portion 125i being between the inner portion 125b and an outer edge of the external portion 125a. The recessed portion 125i may be used to receive a portion of the endcap 127, as discussed below. In the second example above in which the shaft 121 is placed in the first cavity 125h, the inner portion 125b of the grip component 125 may be formed directly on the shaft 121, by being overmolded on the shaft 121.

In an embodiment, the first TPE or TPU material of the external portion 125a may have a first level of hardness, and the second TPE material of the inner portion 125b may have a second level of hardness (as measured when the materials have cooled) that is lower than the first level of hardness. In an embodiment, the first TPE or TPU material of the external portion 125a and the second TPE or TPU material of the inner portion 125b may be chemically bonded (e.g., via an adhesive) of mechanically bonded (e.g., via mechanically interlocking structures formed in the external portion 125a and inner portion 125b). In an embodiment, such a chemical bond (e.g., adhesive) or mechanical bond may be omitted. In an embodiment, the grip component 125 may be formed with only two shots of two different respective types of TPE or TPU material, wherein material of the later-molded shot may have a minimum softness level (e.g., shore A-30 or less). In an embodiment, the grip component 125 may be formed with more than two shots of different respective TPE or TPU materials, in which the last-molded shot may have a certain softness level.

Figure 7A:
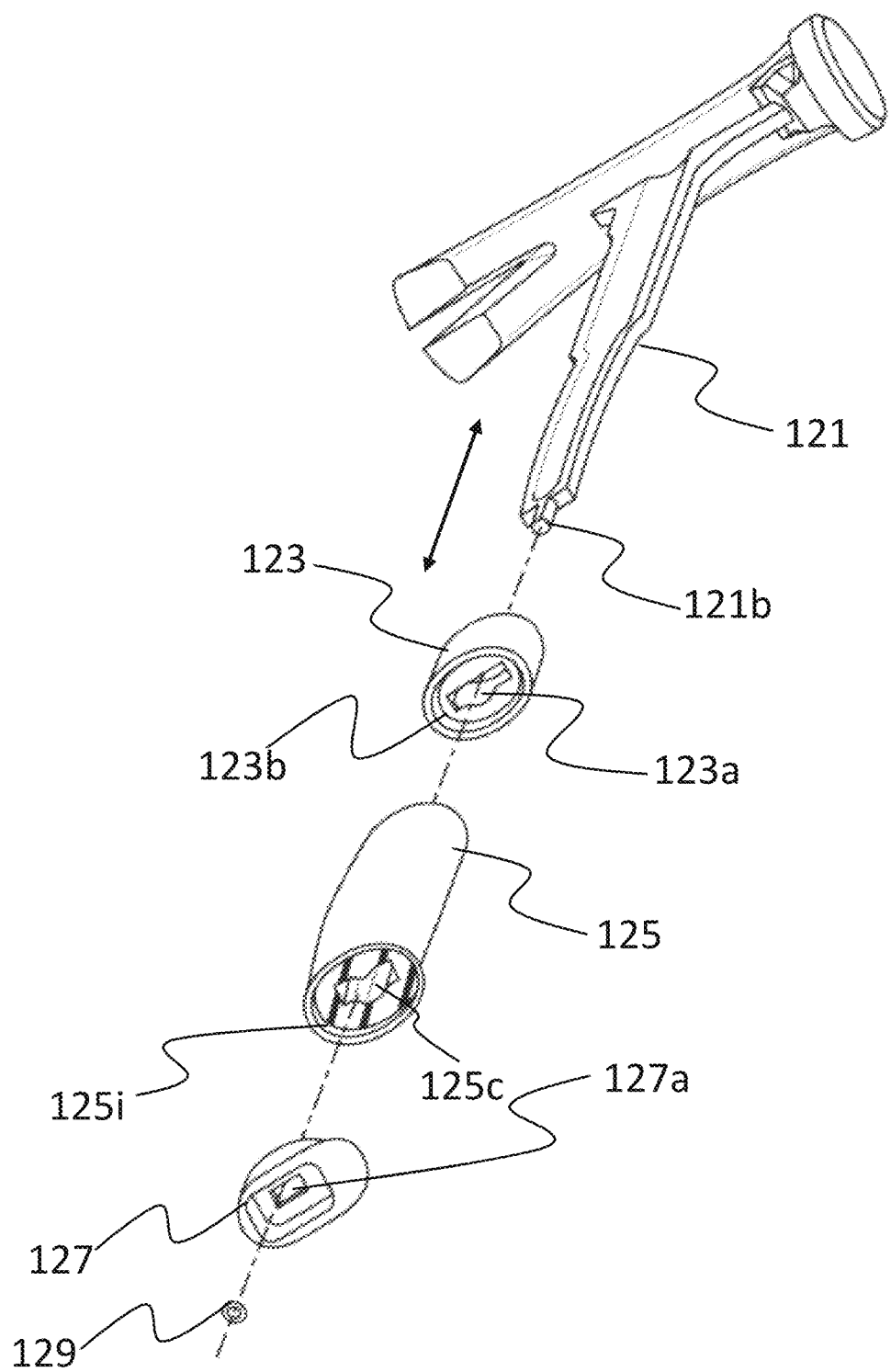
FIG. 7A is an exploded perspective view that illustrates assembly of the components of a handle for a hand tool, according to an embodiment hereof.

In an embodiment, after step 404 is performed to form the grip component 125, a step may be performed to form the handle 120 of the hand tool 100 by sliding the grip component 125 onto the shaft 121 via the second cavity in the grip component. FIG. 7A illustrates the grip component 125 (along with the collar 123 and endcap 127) being slid onto the shaft 121. In an embodiment, no adhesive is applied to shaft 121 or within the cavity 125c before the grip component 125 is slid onto the shaft 121. In an embodiment, only a light adhesive is applied to the shaft 121 before the grip component 125 is slid onto the shaft 121. The light adhesive may refer to an adhesive that has relatively weak bonding strength, and may be used primarily as a lubricant to reduce friction between the inner portion 125b and the shaft 121 as they slide past each other, rather than used to create a strong bond between the shaft 121 and inner component 125b. In an embodiment, the light adhesive may be an adhesive that has a lap shear strength of less than or equal to 500 lb/in$^2$. In an embodiment, the light adhesive may have a long work time and/or dry time, so that the light adhesive is in a liquid or gel form when the grip component 125 is being slid onto the shaft 121. For instance, the light adhesive may have a dry time that is at least 10 minutes. In another example, the light adhesive may have a dry time that is in in a range of one to five days, or four to five days. By being in the liquid or gel form, the light adhesive may lubricate the shaft and/or grip component as they are being slid relative to each other. In other words, because the light adhesive is not intended to create a strong bond between the shaft 121 and inner portion 125b, the light adhesive does not need to be cured before or during formation of the handle 120. That is, the grip component 125 may be attached to the shaft 121 without waiting for the light adhesive to cure. In an embodiment, the light adhesive may be a two-component adhesive. Further, as discussed above, the grip component 125 may be attached to the shaft 121 without compressing the grip component 125 around the shaft 121 along the radial axis 125g of the grip component 125.

In some instances, the step of forming the handle 120 may further include attaching the grip component 125 to the shaft 121 via at least a mechanical fastener. As discussed above, the use of a mechanical fastener rather than a strong adhesive to attach the grip component 125 to the shaft 121 may contribute to an attachment that is looser (e.g., more elastic), which may improve vibration isolation and other forms of shock absorption. In an embodiment, the mechanical fastener may include the endcap 127 and at least one of a screw, nut, and a rivet. In an embodiment, the mechanical fastener may further include a portion of the shaft 121. For instance, as illustrated in FIG. 7A, the mechanical fastener may include the threaded portion 125b of the shaft 121, the endcap 127, and the nut 129. In an embodiment, after the grip component 125 has been slid onto the shaft 121, the threaded portion 121b still protrudes from the grip component 125. Then, the endcap 127 may be pressed against an end of the grip component 125, and the threaded portion 121b of the shaft 121 may pass through an opening 127a of the endcap 127. Then, the nut 129 may be threaded onto the threaded portion 121, so as to attach the endcap 127 to the shaft 121. More specifically, the nut 129 may press against the endcap 127, which in turn presses against the grip component 125 so as to keep the grip component 125 on the shaft 121. In an embodiment, the endcap may be formed from a material (e.g., polypropylene) that has sufficient hardness to bear a pressure being exerted against it by the nut 129. In another embodiment, the external portion 125a of the grip component 125 may be overmolded on the endcap 127.

As further illustrated in FIG. 7A, the collar 123 may be slid onto the shaft 121, after which the grip component 125 is slid onto the shaft 121. The collar 123 may form a cavity 123a that fits around at least a portion of the shaft 121, and may form a recessed portion 123b. As discussed above, the neck portion 125d of the external portion 125a of the grip component 125 may be fitted into the recessed portion 123b of the collar 123. As also discussed above, in other embodiments the external portion 125a may be overmolded on the collar 123, or the collar 123 may be omitted from the handle 120.

Figure 7B:
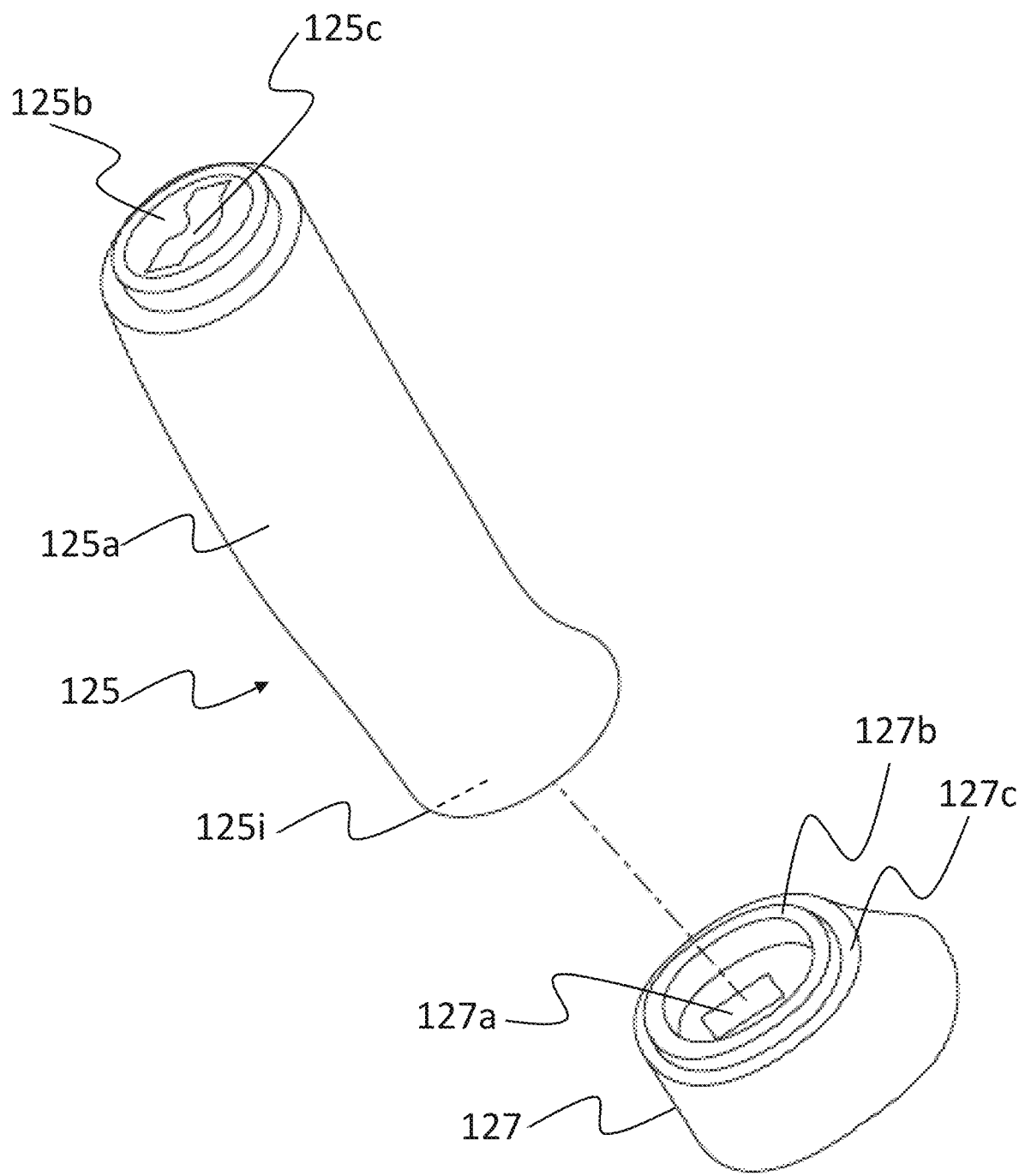
FIG. 7B is an exploded perspective view that illustrates assembly of an endcap with a grip component for a handle of a hand tool, according to an embodiment hereof.

In an embodiment, as illustrated in FIG. 7B, the endcap 127 may have a raised rim 127b that fits within a recessed portion 125i of the grip component 125. The contour of the raised rim 127b may match a profile of the recessed portion 125i, such that the recessed portion 125i fits around the raised rim 127b. In an embodiment, the endcap 127 may have an edge 127c with a contour that matches a contour of an edge of the external portion 125a of the grip component 125, such that the grip component 125 and the endcap 127 are flush when pressed against each other.

As discussed above, the shaft 121 and the cavity 125c may in an embodiment both have a cross section with a curved shape. For instance, the cavity 125c of the grip component 125 in FIG. 7A may have the same shape as illustrated in FIG. 3B. In such an example, a cross section of the cavity 125c, cutting along a radial axis 125g of the grip component 125, may have a curved shape. Further, a cross section of the shaft 121, cutting along a width of the shaft 121, may have the same curved shape as that of the cavity 125c or 123a.

Figure 8:
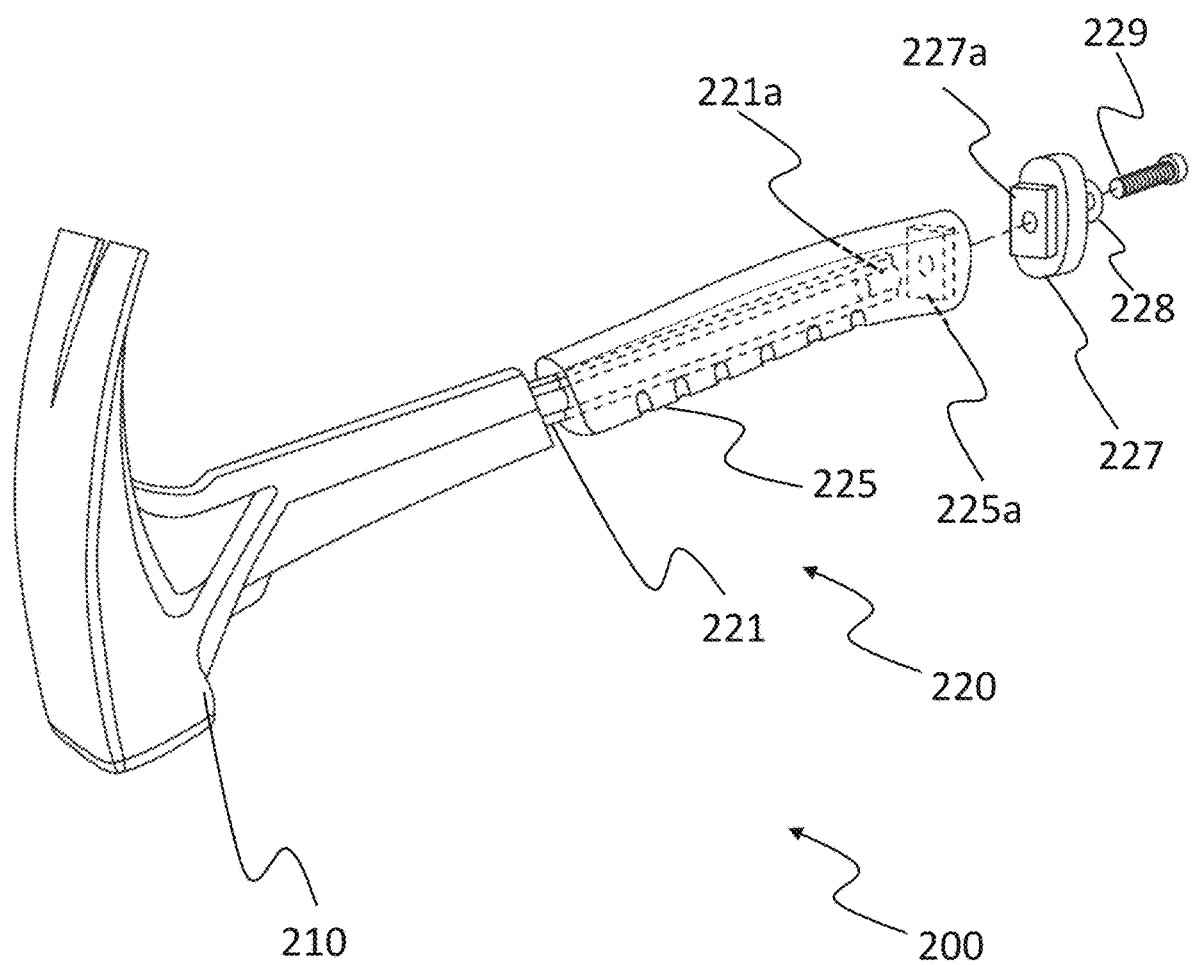
FIG. 8 is a perspective view that illustrates assembly of another embodiment of a hand tool, according to an embodiment hereof.

In another embodiment, as illustrated in FIG. 8, a mechanical fastener used for attaching a grip component to a shaft may include a threaded post, an endcap, and a screw. More specifically, FIG. 8 illustrates a hand tool 200 having a head portion 210 and a handle 220. The handle 220 is formed by a shaft 221, a grip component 225 that is a reverse-molded grip as described above, and an endcap 227. In the embodiment of FIG. 8, one end of the shaft 221 may form a threaded portion that is a threaded post 221a. The threaded post 221a may have a cylindrical cavity with threads on an inner surface of the cavity. During assembly of the hand tool 200, the grip component 225 may be slid onto the shaft 221, after which the endcap 227 is pressed against the grip component 225. In an embodiment, the endcap 227 may have a raised portion 227a that fits into a recessed portion 225a of the grip component 225. After the endcap 227 is pressed against the grip component 225, a screw 229 may be inserted through the endcap 227 and into the grip component 225 as well as into the threaded post 221a, so as to attach the endcap 227 to the grip component 225. In this embodiment, the screw 229 may press against the endcap 227 (e.g., via a washer 228), which may in turn press against the grip component 225 to keep the grip component 225 on the shaft 221. In another embodiment, the mechanical fastener may include a rivet (e.g., blind rivet) that attaches the shaft 221 to the grip component 225.

Figure 9A:
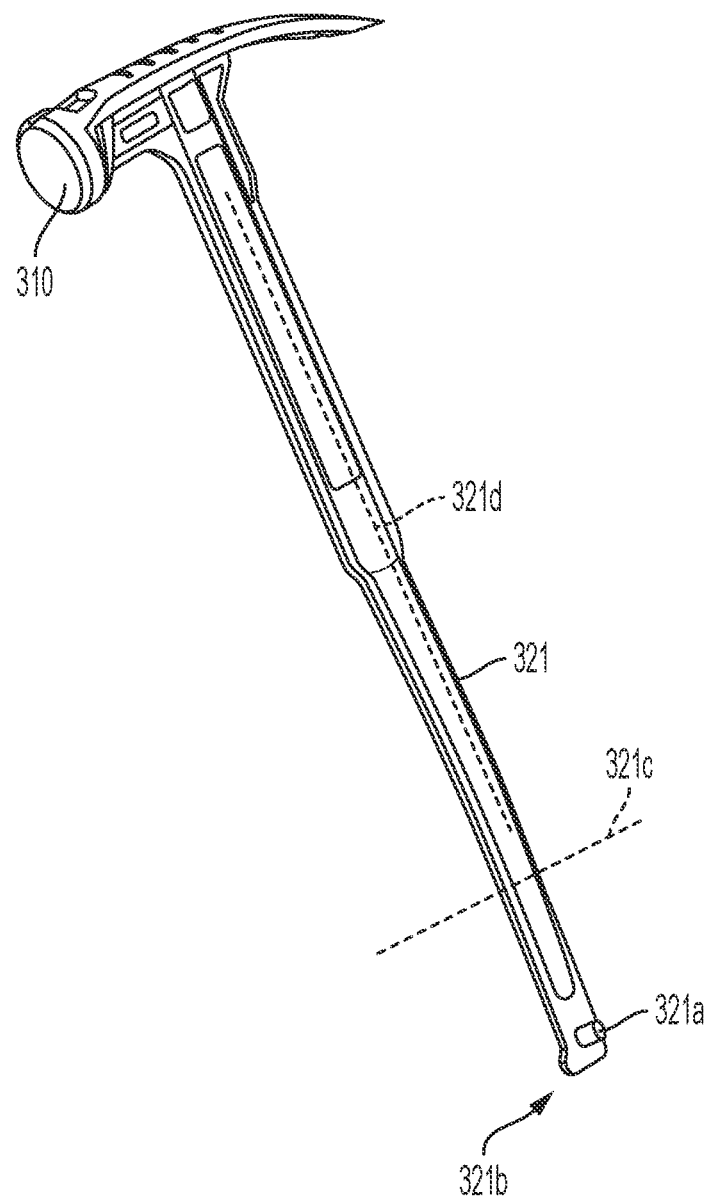
FIGS. 9A and 9B illustrate perspective views of a shaft that has a blind post, according to an embodiment hereof.
Figure 9B:
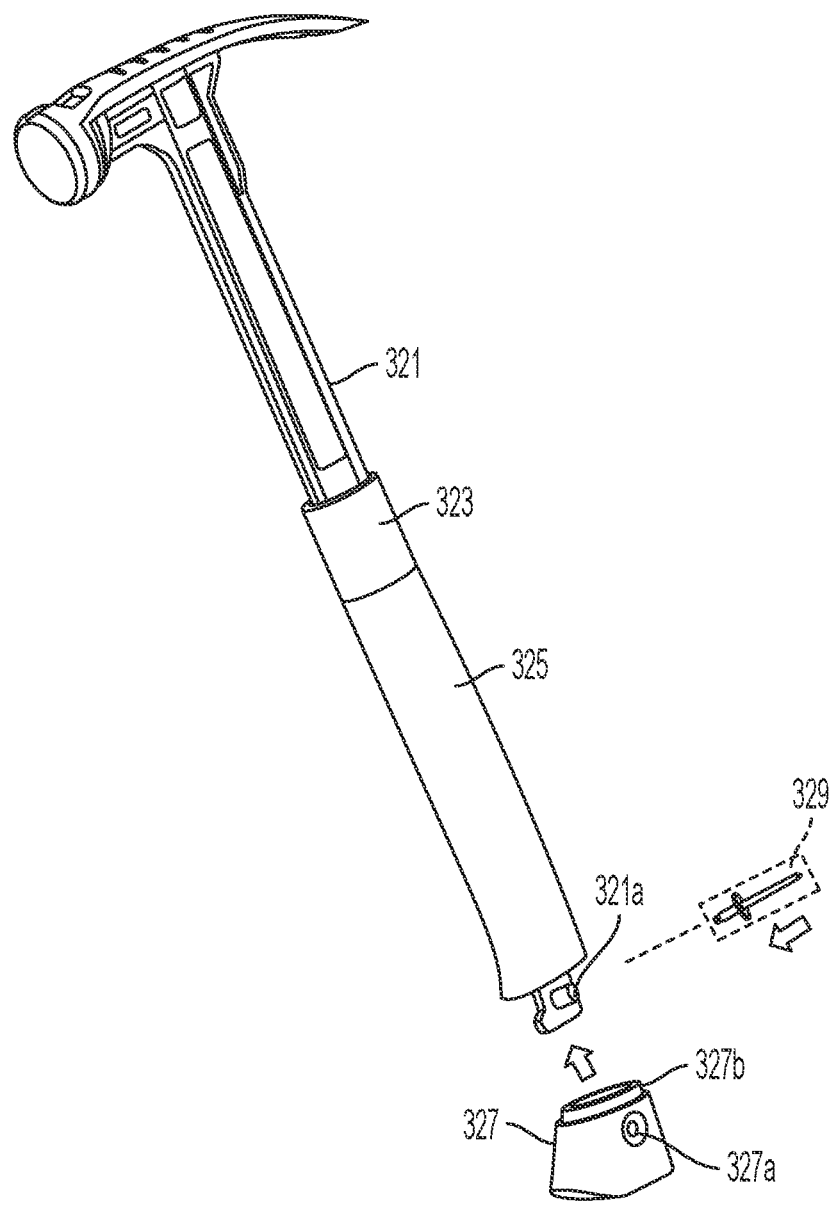

FIGS. 9A and 9B illustrate the use of a rivet 329, a blind post 321a, and an endcap 327 to attach a grip component 325 to a shaft 321 of a handle. More specifically, FIG. 9A illustrates a shaft 321 attached to or integral with a head portion 310 of a hand tool. The shaft 321 may have a blind post 321a disposed at a second end 321b of the shaft 321, opposite to an end of the shaft 321 at which the shaft 321 is connected to or integral with the head portion 310. The blind post 321a may extend along a thickness axis 321c of the shaft 321. More generally speaking, the blind post 321a may extend in a direction perpendicular to a longitudinal axis 321d of the shaft 321. The blind post 321a has a blind hole therein, wherein the blind hole also extends along the thickness axis 321c of the shaft 321. In the embodiment of FIG. 9A, the blind post 321a is the only blind post disposed at the second end 321b of the shaft 321. In another embodiment, the shaft 321 may have another blind post attached to or integral with the opposite side of the shaft 321 relative to where the blind post 321a is attached to or integral with the shaft 321. The other blind post may extend in an opposite direction relative to the blind post 321a.

FIG. 9B depicts a collar 323 and a grip component 325 (which has an external portion 325a and inner portion 325b that are the same or similar to the portions described above) that are slid onto the shaft 321, and illustrates an endcap 327 that may be slid over the second end 321b of the shaft 321. The endcap 327 may have a hole 327a that will line up with the blind hole of the blind post 321a after the endcap 327 has been slid onto the shaft 321. In an embodiment, the hole 327a extends from an outer side surface of the endcap through to a cavity within the endcap 327. A rivet 329 may be inserted through the hole 327a and into the blind hole of the blind post 321a to attach the shaft 321 to the endcap 327, which will press against the grip component 325 to keep the grip component 325 on the shaft 321. The rivet 329 may be, e.g., a solid or barrel-type rivet. In another embodiment, the blind post 321a may be threaded, and the rivet 329 may be replaced with a screw. In another embodiment, the blind post 321a may be replaced with a first through-hole extending through the shaft 321, and the endcap 327 may have a second through-hole extending through the endcap. In such an embodiment, the endcap 327 may be attached to the shaft 321 with a screw that extends through both through-holes, and with a nut.

Figure 9C:
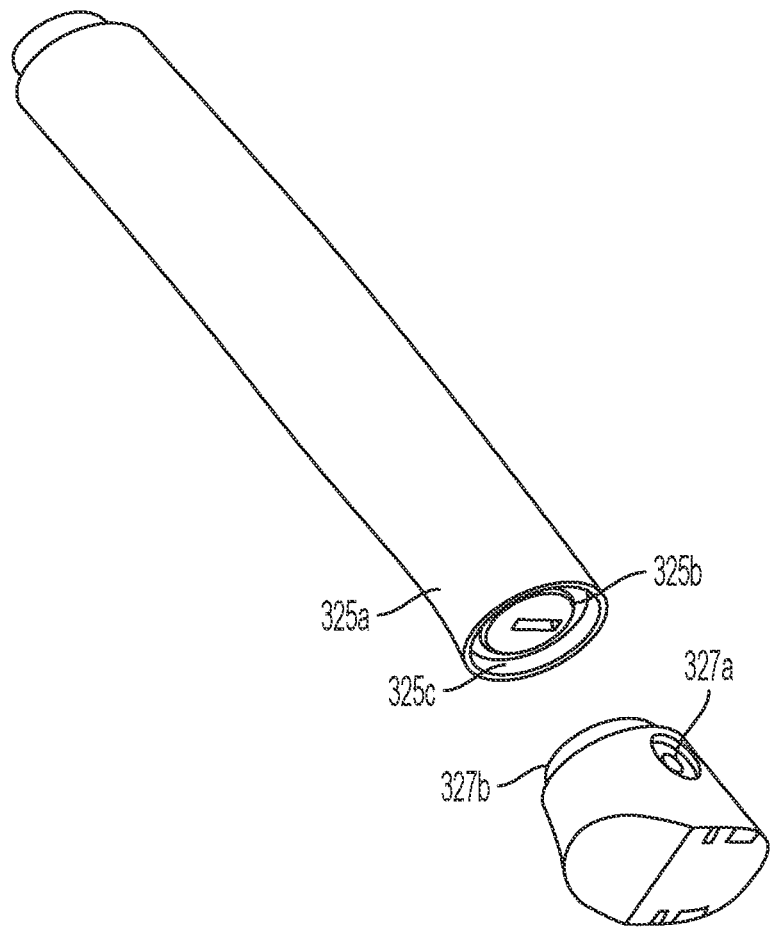
FIG. 9C illustrates a perspective view of a grip component and of an endcap, according to an embodiment hereof.

FIG. 9C provides another view showing the endcap 327 having a raised rim portion 327b that can be slid into a recessed portion 325c of the grip component 325 so as to press against the grip component 325.

Figure 10A:
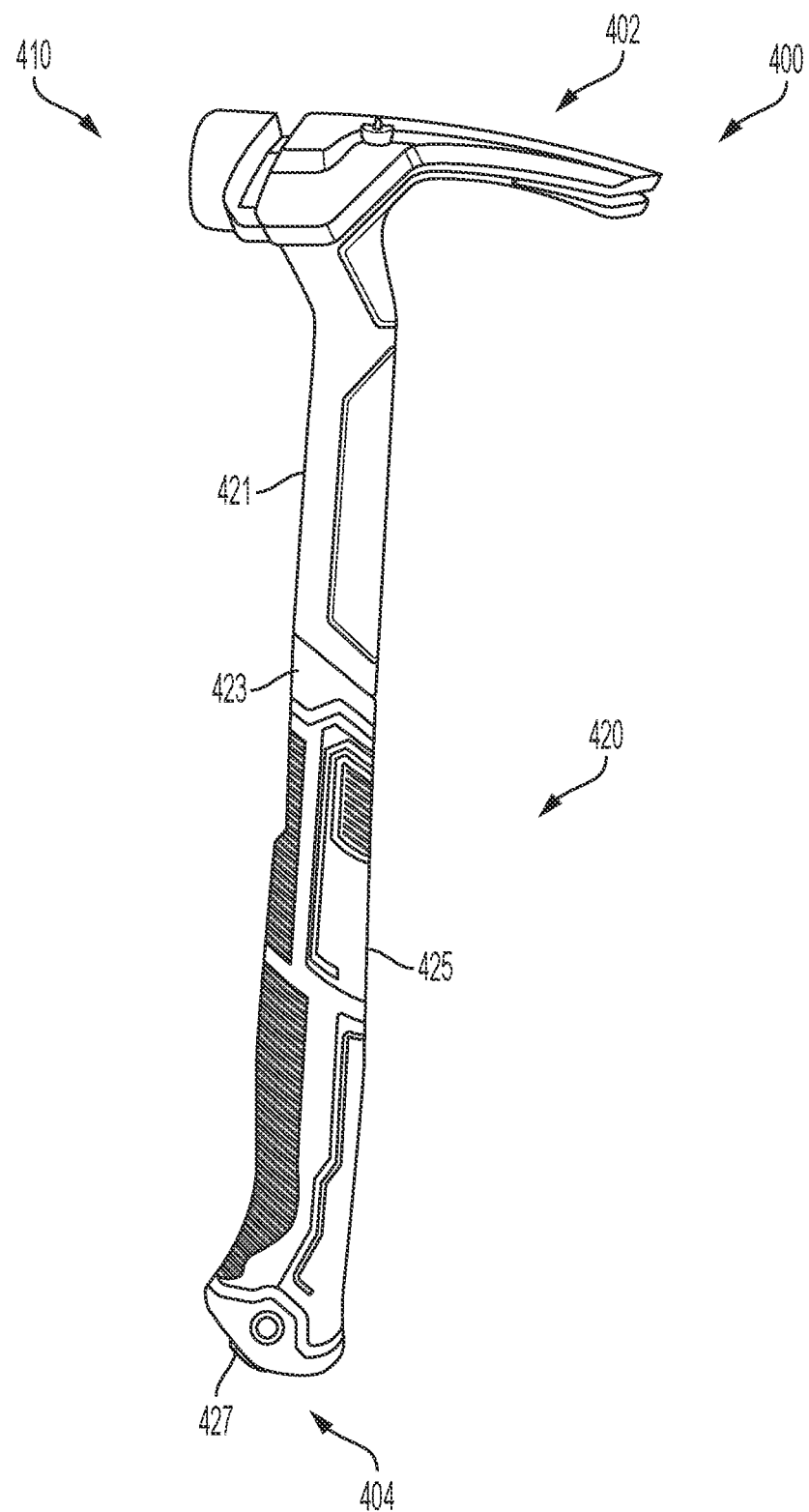
FIGS. 10A-10F illustrate a hand tool and a method of forming a hand tool, according to an embodiment hereof.

FIG. 10A depicts a hand tool 400 having a grip component 425 which is formed directly on a shaft 421 of the hand tool 400. More specifically, the hand tool 400 includes a head portion 410, a shaft 421, and a handle 420. The head portion 410 is disposed at a first end 402 of the hand tool 400, while the shaft 421 is attached to or integral with the head portion 410 and extends toward a second and opposite end 404 of the hand tool 400. The handle 420 may include the shaft 421 and a grip component 425, which may be disposed around the shaft 421 at the second end 404 of the hand tool 400. As illustrated in FIG. 10A, the hand tool 400 may further have a collar 423 disposed at one end of the grip component 425, and an endcap 427 disposed at another end (an opposite end) of the grip component 425.

Figure 10B:
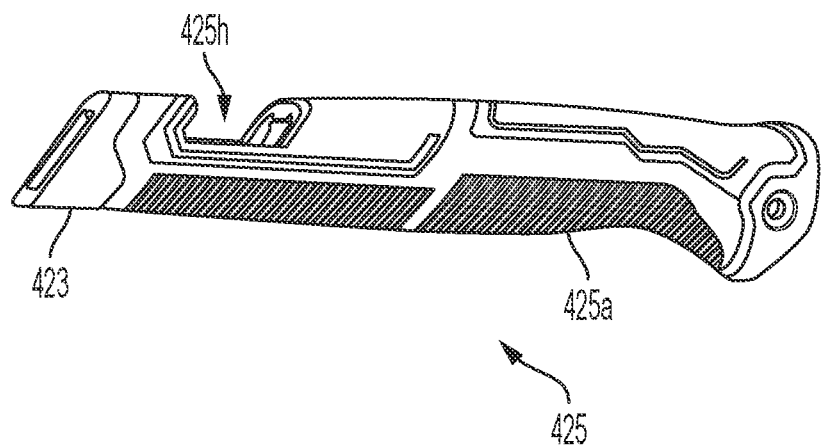
Figure 10C:
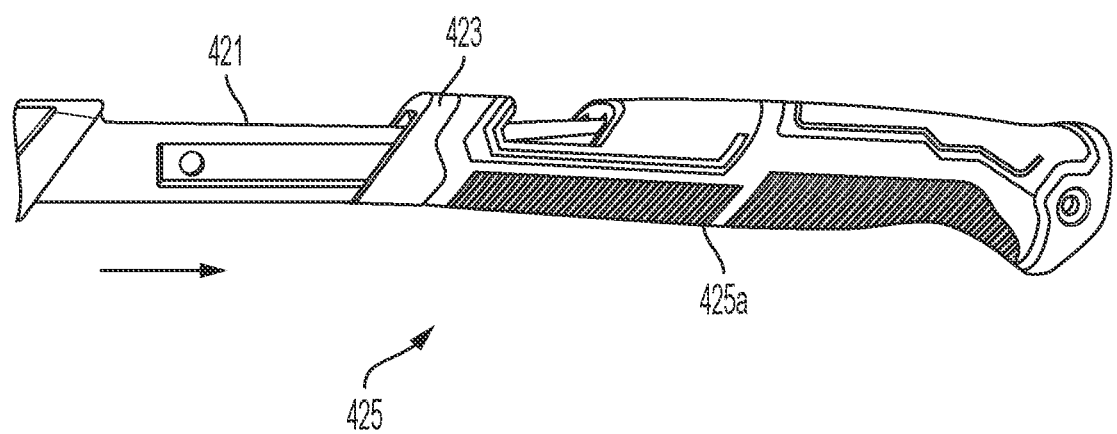
Figure 10D:
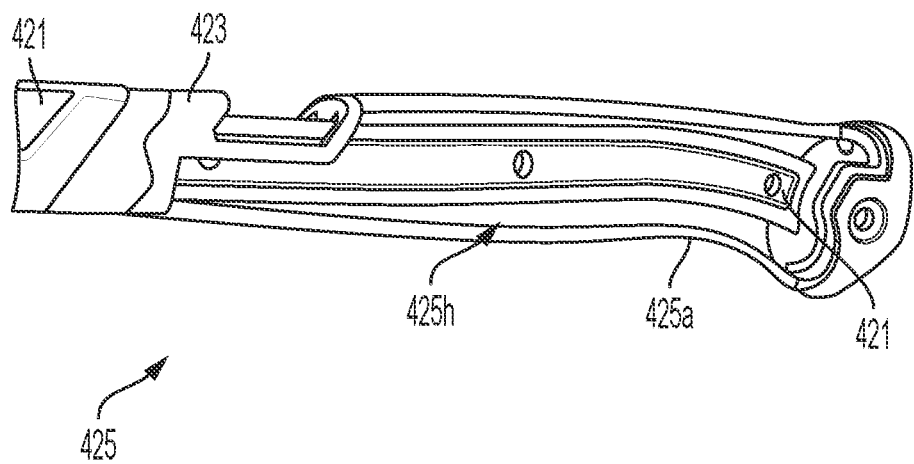
Figure 10E:
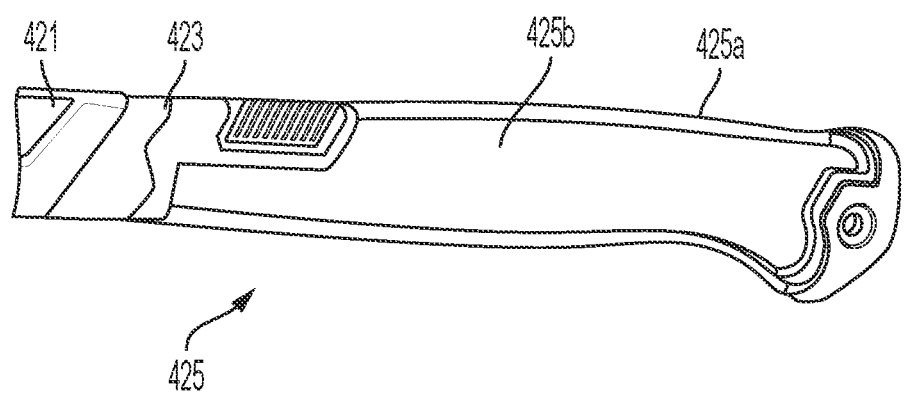

In an embodiment, the grip component 425 may be a reverse-molded grip component, which may be a component in which an inner portion is formed after an external portion is formed. More specifically, the grip component 425 may have an external portion 425a, as depicted in FIGS. 10B through 10E, and an inner portion 425b, as depicted in FIG. 10E. FIGS. 10B through 10F depict a series of steps for making the grip component 425 of the hand tool 400. More specifically, the grip component 425 may be formed by first forming the external portion 425a thereof, as illustrated in FIG. 10B. In some instances, the external portion 425a may be formed by molding a first thermoplastic elastomer (TPE) material or thermoplastic urethane (TPU) material into a shell that surrounds a first cavity 425h, in a manner similar to that described above for FIGS. 5A-5C. For instance, the external portion 425a may be formed with a mold that surrounds the first cavity and that causes the first TPE or TPU material to form the shell surrounding the first cavity. In some cases, the collar 423 (if one is included in the hand tool 400) may be pressed against the external portion 425a, and may be flush with the external portion 425a. In some cases, the external portion 425a may be overmolded on the collar 423 (if a collar is included in the hand tool 400).

In an embodiment, forming the grip component 425 may further involve placing the shaft 421 into the first cavity 425h. In some instances, the shaft 421 may be placed into the first cavity 425h after the external portion 425a of the grip component 425 is formed into the shell surrounding the first cavity 425h, as illustrated in FIGS. 10B, 10C, and 10D. Placing the shaft 421 into the first cavity 425h in such instances may involve moving the shaft 421 into the first cavity 425h while the external portion 425a remains stationary, or moving the external portion 425a until the shaft 421 is inside the first cavity 425h while the shaft 421 remains stationary, or moving both the external portion 425a and the shaft 421 toward each other. As depicted in FIG. 10D, this step may involve placing a portion of the shaft 421 to extend along an entire length dimension of the first cavity 425h, from one end of the first cavity 425h to the other end of the first cavity 425h. More specifically, FIG. 10D depicts a partial sectional view of the external portion 425a of the grip component 425 in which one side of the external portion 425a removed, thus allowing the shaft 421 inside the first cavity 425h to be visible. As depicted in FIG. 10D, placing the shaft 421 into the first cavity 425h may involve placing a portion of the shaft 421 into the first cavity 425h, wherein that portion fills as much of the first cavity 425h as possible, or more generally fills most of the first cavity 425h. This portion of the shaft 421 may be, e.g., one third or one half of the shaft 421 along a length dimension of the shaft 421. In some instances, the shaft 421 may be placed into the first cavity 425h before the external portion 425a is formed, or while it is being formed. In such instances, the first cavity 425h may be a space surrounded by the mold that will be used to form the external portion 425a, and the shaft 421 may be placed into this space.

In an embodiment, forming the grip component 425 may further involve forming the inner portion 425b of the grip component after the external portion 425a is formed and after the shaft 421 is placed into the first cavity 425h (which is surrounded by the shell formed by the external portion 425a). The inner portion 425b may be formed by injecting a second TPE material or TPU material into the first cavity 425h, such that the second TPE or TPU material flows around and onto the shaft 421. For instance, a shot of the second TPE material or TPU material may be melted and injected into the first cavity 425h, so that the second TPE material or TPU material flows around and onto the shaft 421 and fills the first cavity 425h, such that the the inner portion 425b is overmolded on the shaft 421, as depicted in FIG. 10E. More specifically, FIG. 10E depicts a partial sectional view of the grip component 425 in which one side of the external portion 425a is removed, but none of the inner portion 425b is removed. Thus, the inner portion 425b is visible in FIG. 10E, which shows the inner portion 425b covering the shaft 421. In this example, the inner portion 425b of the grip component may be disposed around the shaft 421, and the external portion 425a of the grip component may form a shell around the inner portion 425b.

Figure 10F:
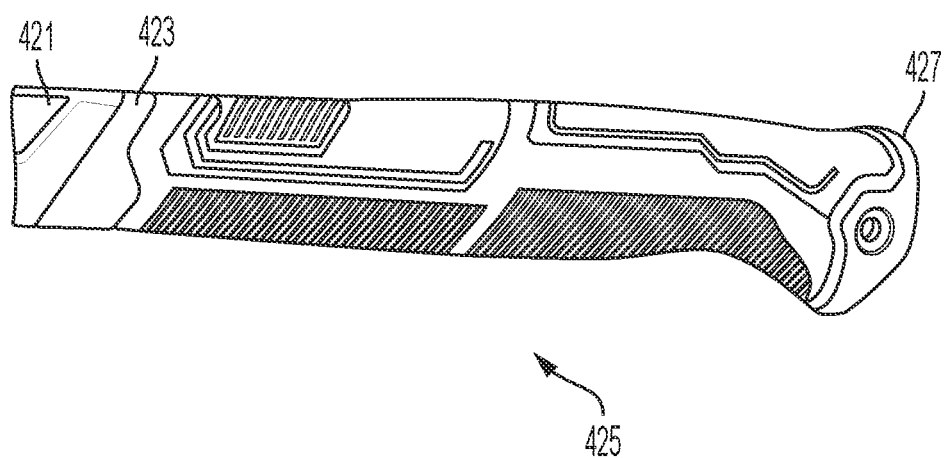

In an embodiment, the first TPE or TPU material has a first level of hardness, and the second TPE or TPU material has a second level of hardness lower than the first level of hardness. The durometer of the first TPE or TPU material and of the second TPE or TPU material may be similar to what is described above with respect to FIGS. 1A through 9C. FIG. 10F depicts the resulting grip component 425 after the external portion 425a and the inner portion 425b are formed.

In an embodiment, the second TPE or TPU material of the inner portion 425b of the grip component 425 is in direct contact with the shaft 421. Further, because the second TPE or TPU material of the inner portion 425b was melted and then flowed onto the shaft 421, no space exists between the shaft 421 and the second TPE or TPU material of the inner portion 425b of the grip component 425.

In an embodiment, the second TPE or TPU material of the inner portion of the grip component is in direct contact with the shaft, wherein there is no other material between the grip component and the inner portion. Further, after the second TPE or TPU material of the inner portion of the grip component cooled around the shaft 421, the second TPE or TPU material may be bonded (also referred to as being adhered) to the shaft. Thus, the embodiment depicted in FIGS. 10A through 10F may result in a structure in which the shaft 421 has a strong bond to the grip component 425, which may facilitate better handling of the hand tool 400 and better absorption of vibration by the second TPE or TPU material of the inner portion 425b, because it forms a more integral structure with the shaft 421. In some cases, the strong bond achieved from overmolding the inner portion 425b on the shaft 421 may allow the handle 420 to be formed without needing to compress the grip component 425 around the shaft 421 in a radially inward direction.

In an embodiment, the external portion 425a may be an exposed user contact surface of the grip component 425. In an embodiment, the endcap 427 may form the second end 404 of the hand tool, and the external portion 425a and the inner portion 425b may form a recessed portion of the grip component 425 that fits around a portion of the endcap 427. In an embodiment, a thickness of the inner portion 425b may be greater than a thickness of the external portion 425a. In another embodiment, the inner portion 425b may have less thickness than the external portion 425a.

As stated above, embodiments of the reverse-molded grip component as described above may reduce vibration at a user contact surface of the grip component, as compared with vibration at surfaces of other types of grip components. The vibration may be reduced in terms of amplitude, ring rate (i.e., frequency), and ring fade time as compared with other types of grip components. Table 1 illustrates example test results that illustrate the improved vibration isolation:

TABLE 1

| | Max displacement at measuring point | RMS (mm/s) | Ring fade duration | Transfer Function (mm/s/N) |
|---|---|---|---|---|
| Reverse-Molded Grip Component | 1.2 | 56 | 0.054 | 2.29 |
| Other type of Grip Component | 4.0 | 151 | 0.055 | 7.12 |

FIGS. 11A-11D illustrate a hand tool 500, such as a screwdriver, that also has a reverse-molded grip component 525. More specifically, the hand tool 500 may include a shaft 521 and a handle 520. In an embodiment, the shaft 521 may form a driving bit at a first end 502 of the hand tool 500, or may have a bit-receiving socket at the first end 502 of the hand tool 500, wherein the bit-receiving socket may be adapted to receive a driving bit. The driving bit may, e.g., form a tapered portion that is adapted to engage a portion (e.g., a screw head) on a screw or other fastener. For instance, the driving bit may form a blade or tip that is adapted to engage one or more grooves on a screw head of a screw.

Figure 11A:
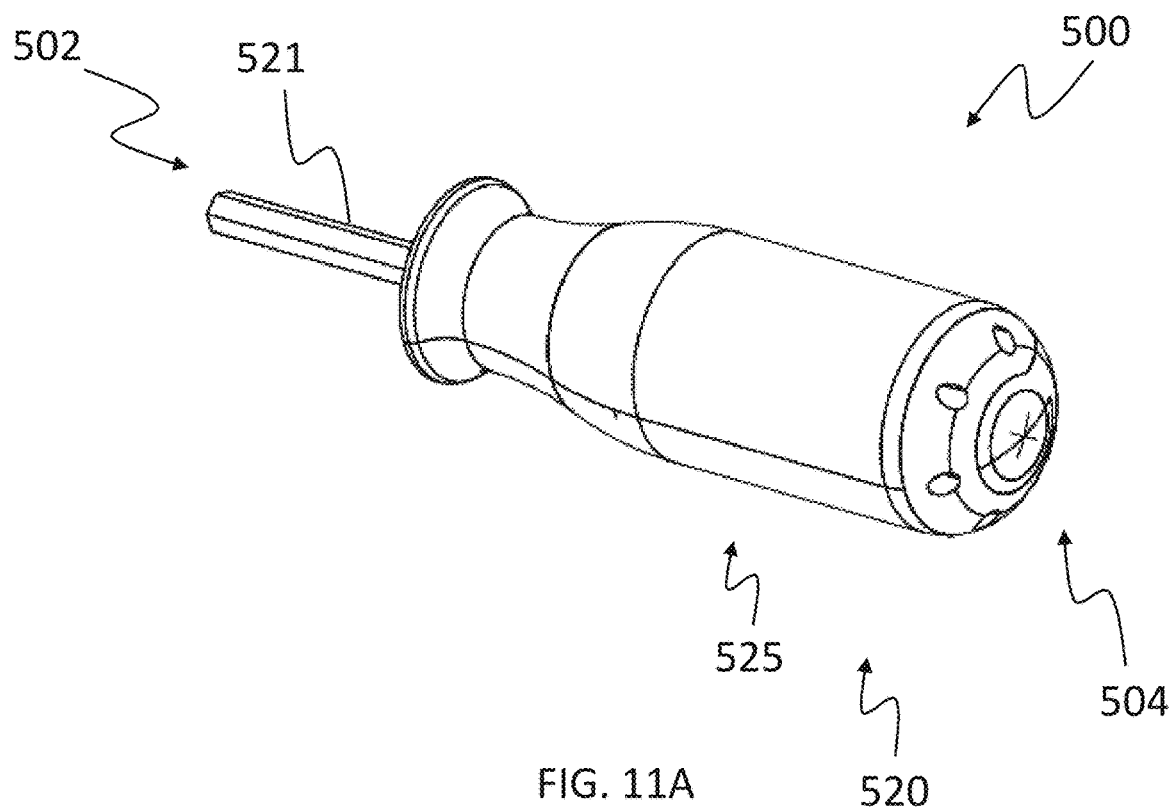
FIGS. 11A-D illustrate a hand tool having a shaft and a handle with a reverse-molded grip component, according to an embodiment hereof.
Figure 11B:
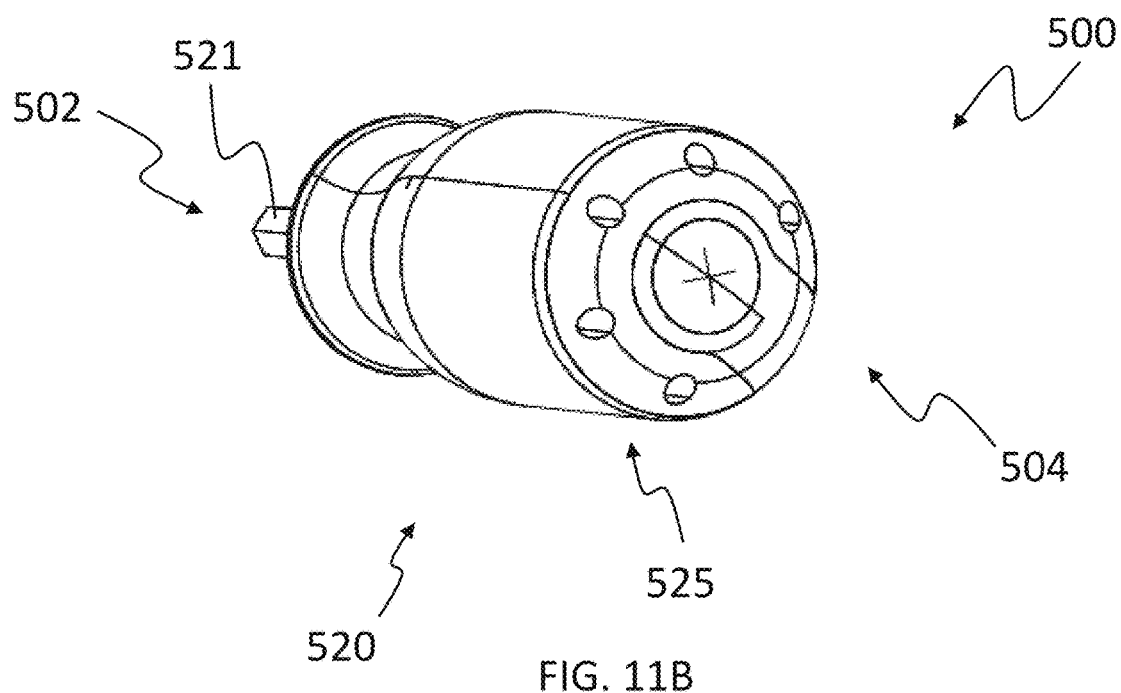
Figure 11C:
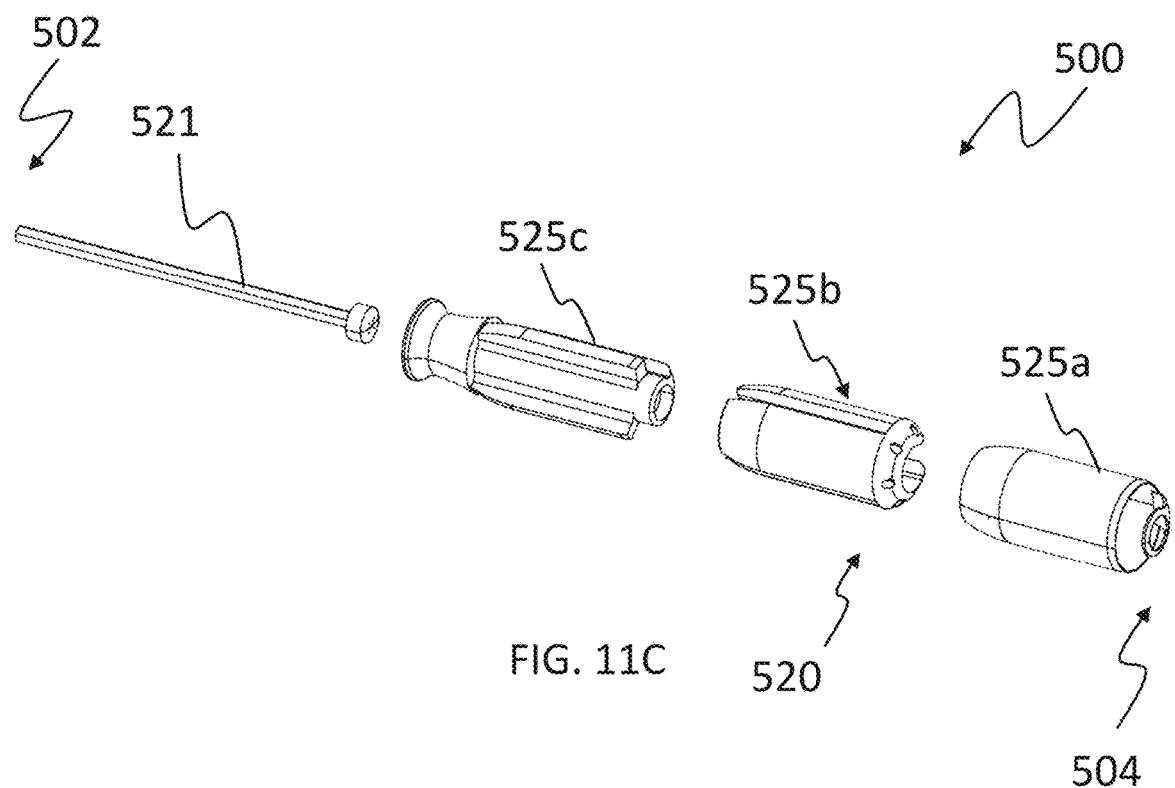
Figure 11D:
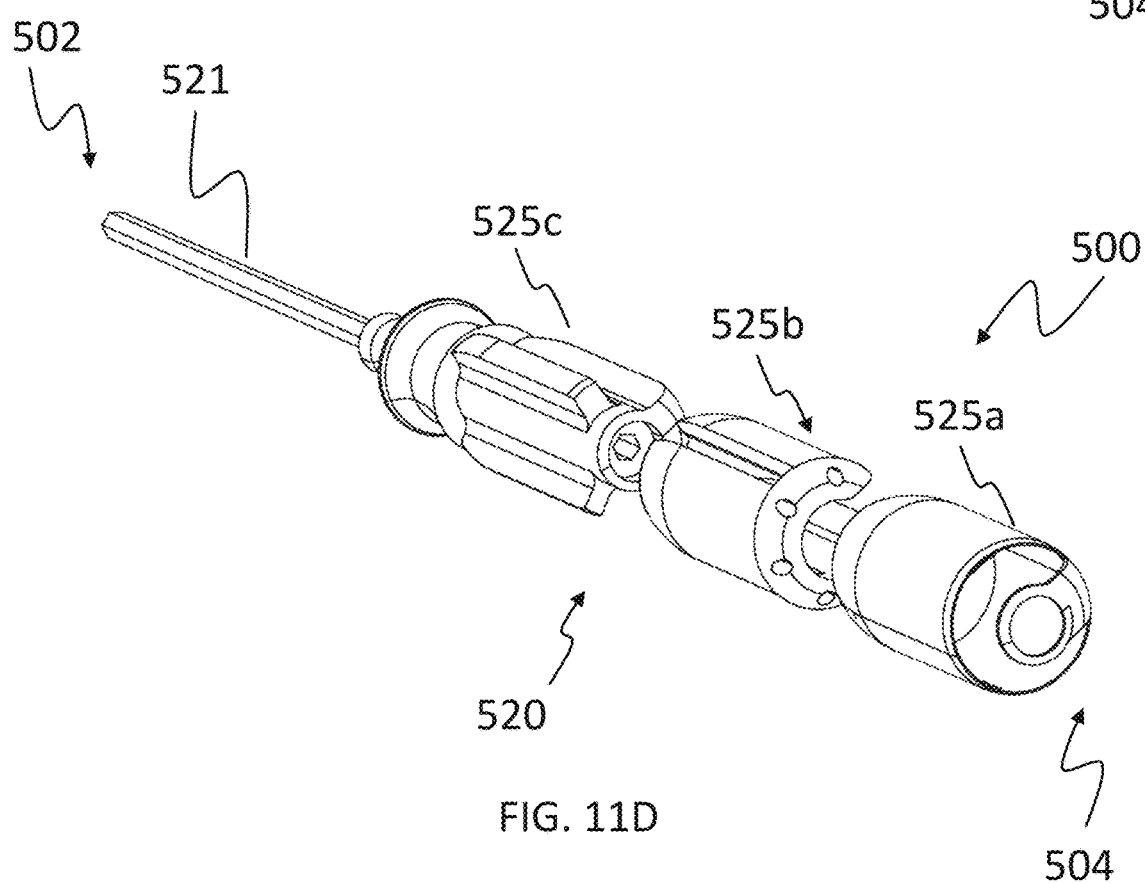

In an embodiment, the handle 520 may be disposed at a second end 504 of the hand tool 500, and may include a grip component 525 disposed around the shaft 521. As depicted in FIGS. 11C and 11D, which provide an exploded view of the hand tool 500, the grip component 525 may include an external portion 525a that is formed by a first thermoplastic elastomer (TPE) material or thermoplastic urethane (TPU) material, and by a first inner portion 525b formed by a second TPE or TPU material that is softer (i.e., has a lower level of hardness) than the first TPE or TPU material. As discussed below in more detail, the grip component 525 may be a reverse-molded grip component in which the first inner portion 525b is formed after the external portion 525a is formed.

In the embodiment illustrated in FIGS. 11C and 11D, the handle 520 may further include a second inner portion 525c that is formed from a material that is, e.g., harder than the external portion 525a. More specifically, the material of the second inner portion 525c in such an example may be harder than the first TPE or TPU material (as measured once the first TPE or TPU material has cooled to form the external portion 525a). For instance, the second inner portion 525c may be formed from a hard plastic (e.g., to form a plastic having a ridge or multiple ridges), or from metal. The material may have a durometer that, e.g., that is higher than or equal to shore D-10, or higher than or equal to shore D-30, though these values are merely examples, and the material for the second inner portion 525c may have some other durometer value. In some cases, the second inner portion 525c may form a frame, or more generally a support structure, that provides structural support to the external portion 525a of the grip component 525. Such a support structure may, e.g., help defining an outer shape of the handle 520 and/or may resists an external force being applied to the external portion 525a when the handle 520 is being gripped. Thus, the second inner portion 525c may also be referred to as a frame portion for the handle. The second inner portion 525c may be considered part of the grip component 525, or may be considered more generally to be part of the handle 520. Further, the second inner portion 525c may be completely enclosed within (also referred to as being surrounded by) the external portion 525a of the grip component 525, or may be only partially enclosed by the external portion 525a.

Figure 12A:
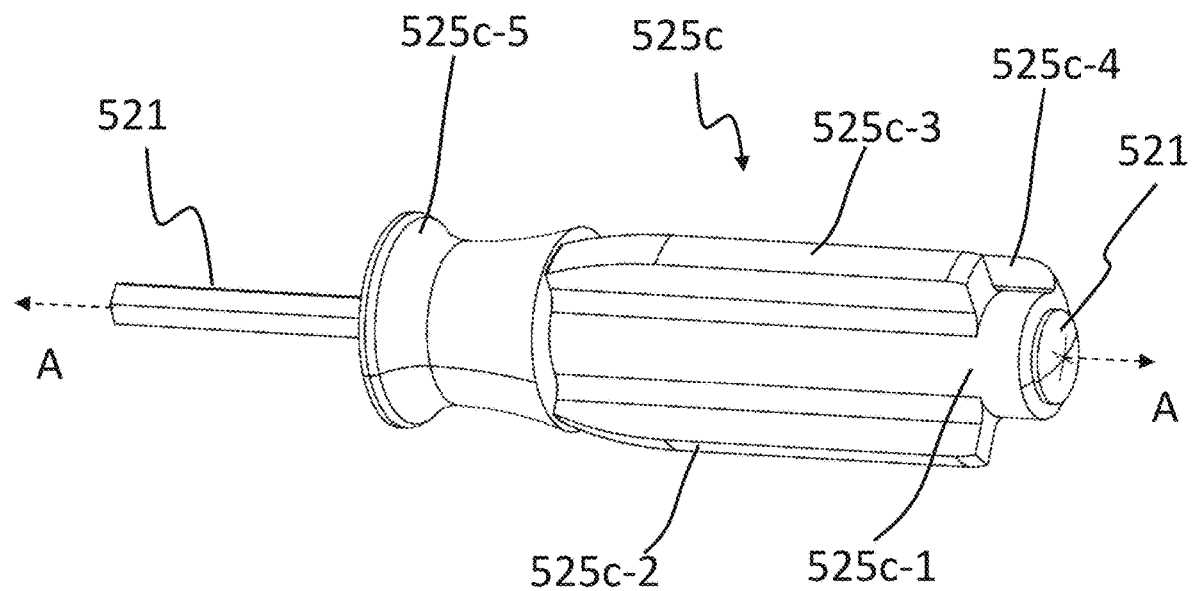
FIGS. 12A-D illustrate an inner portion, such as hard plastic, formed around a shaft of a hand tool, according to an embodiment hereof.
Figure 12B:
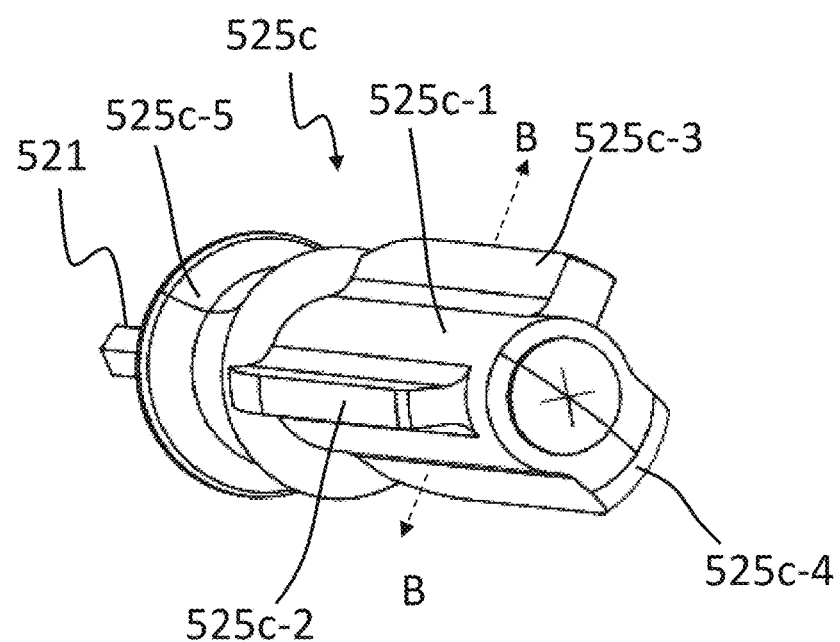
Figure 12C:
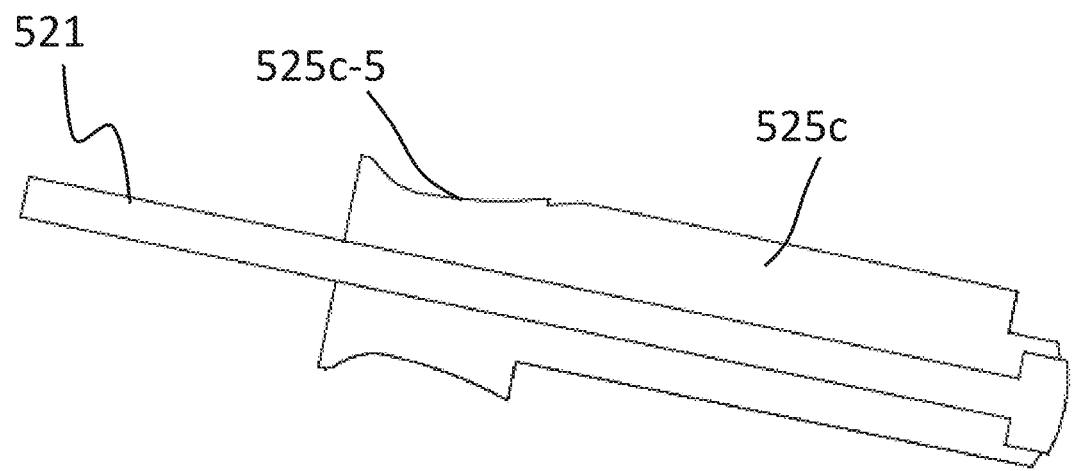
Figure 12D:
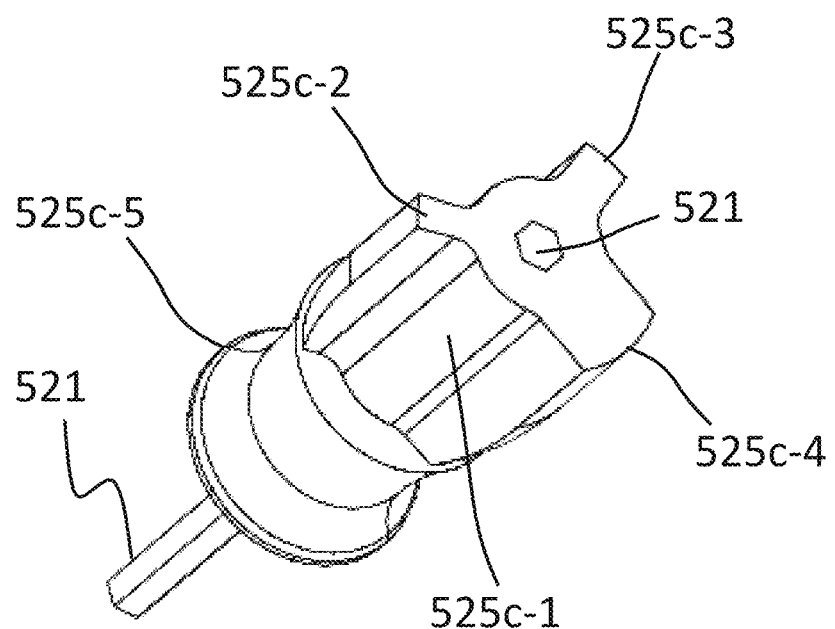

In some instances, the hand tool 500 may omit the second inner portion 525c, and/or may have a handle 520 that includes only the shaft 521, the external portion 525a formed from the first TPE or TPU material, and the first inner portion 525b formed from the second TPE or TPU material. In other instances, the hand tool 500 may include the second inner portion 525c as part of the handle 520, as discussed above and as illustrated in FIGS. 11C and 11D, as well as in FIGS. 12A-12D. More specifically, FIGS. 12A-12D depict an embodiment in which the hand tool 500 is formed by disposing the second inner portion 525c around the shaft 521, before the external portion 525a and the first inner portion 525b are disposed around the shaft 521. FIG. 12A provides a side view of the hand tool 500, while FIG. 12B provides a perspective view. Additionally, FIG. 12C provides a sectional view of the hand tool 500 cut along the line A-A, while FIG. 12D provides another sectional view of the hand tool 500 cut along the line B-B.

As illustrated in FIGS. 12A-12D, the second inner portion 525c may be disposed on the shaft 521, or more specifically may at least partially surround the shaft 521. In some cases, the second inner portion 525c may be formed directly on the shaft 521. For instance, the second inner portion 525c may be formed via injection molding, and the shaft 521 may be placed into a mold used for the injection molding. In such an example, the material for the second inner portion 525c is injected into the mold after the shaft 521 is placed into the mold. The material for the second inner portion 525 may flow directly on the shaft 521. In other cases, the second inner portion 525c may be formed separately from the shaft 521, and may then be slid onto the shaft 521.

As further depicted in FIGS. 12A-12D, the second inner portion 525c may in an embodiment have a sleeve portion 525c-1 and one or more wall portions, or more specifically a plurality of wall portions 525c-2, 525c-3, and 525c-4. The sleeve portion 525c-1 may be in direct contact with the shaft 521, and may extend along a longitudinal axis of the shaft 521, so as to form a sleeve around the shaft 521. In an embodiment, the plurality of wall portions 525c-2, 525c-3, and 525c-4 may each extend away from the sleeve portion 525c-1. For example, the plurality of wall portions 525c-2, 525c-3, and 525c-4 may extend outward along a radial axis of the shaft 521 (i.e., in a radially outward direction). As discussed below in more detail, the plurality of wall portions 525c-2, 525c-3, and 525c-4 may later support the external portion 525a of the grip component 525, and/or may be used to form multiple chambers containing the second TPE or TPU material of the first inner portion 525b. In an embodiment, the plurality of wall portions 525c-2, 525c-3, and 525c-4 may be equally spaced circumferentially. For instance, the respective angles separating adjacent wall portions of the plurality of wall portions 525c-2, 525c-3, and 525c-4 may be the same or substantially the same. In an embodiment, the sleeve portion 525c-1 and the plurality of wall portions 525c-2, 525c-3, and 525c-4 may later be completely enclosed by the external portion 525a of the grip component 525. As depicted in FIGS. 12A-12D, In some cases, the second inner portion 525c may further form a neck portion 525c-5 for the handle 520. The neck portion 525c-5 may also later be enclosed by the external portion 525a, or may instead remain not covered by the external portion 525a.

Figure 13A:
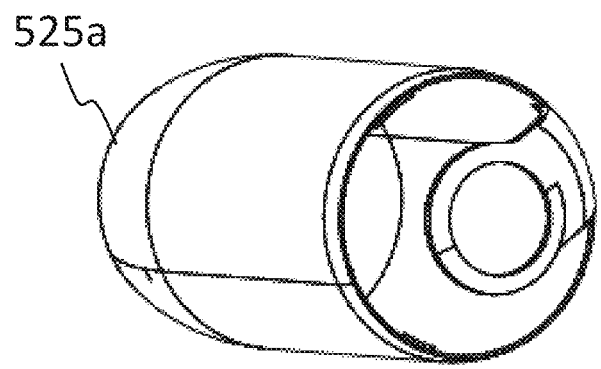
FIGS. 13A and 13B illustrate an external portion of a grip component forming a shell, according to an embodiment hereof.
Figure 13B:
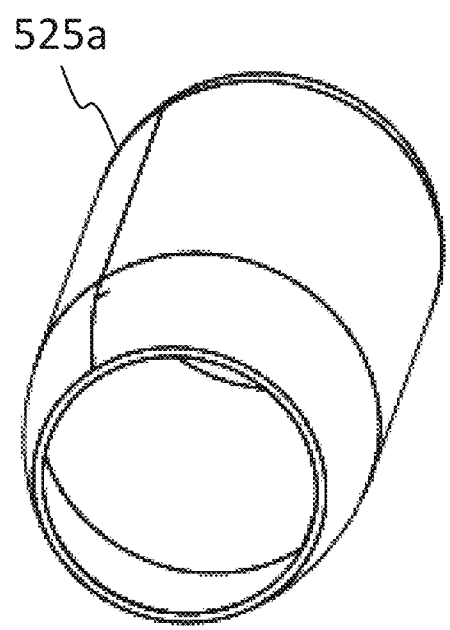

As stated above, the grip component 525 of the hand tool 500 may be a reverse-molded component that is formed by forming the external portion 525a with the first TPE or TPU material, and then forming the first inner portion 525b with the second TPE or TPU material. FIGS. 13A and 13B illustrate an example of the external portion 525a of the grip component 525. In an embodiment, the external portion 525a may be formed by, e.g., molding the first TPE or TPU material into a shell, as depicted in FIGS. 13A and 13B. In an embodiment, the first TPE or TPU material may be abrasion-resistant, so as to form a wear-resistant external portion 525a.

Figure 14A:
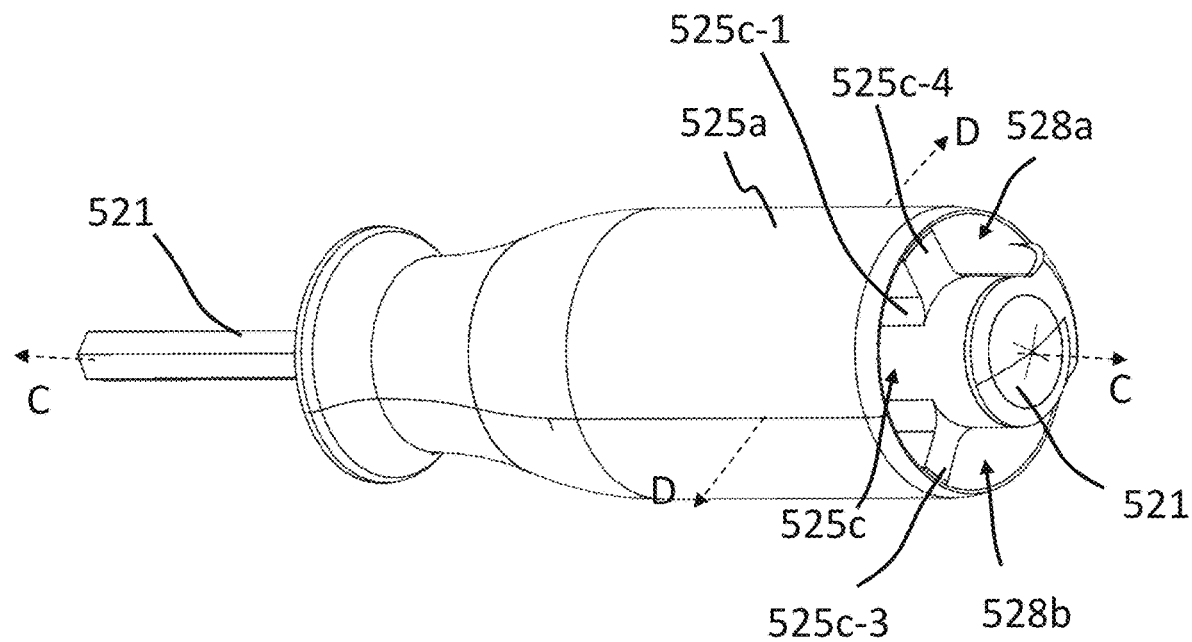
FIGS. 14A-14D illustrate an external portion of a grip component formed around a shaft of a hand tool, according to an embodiment hereof.
Figure 14B:
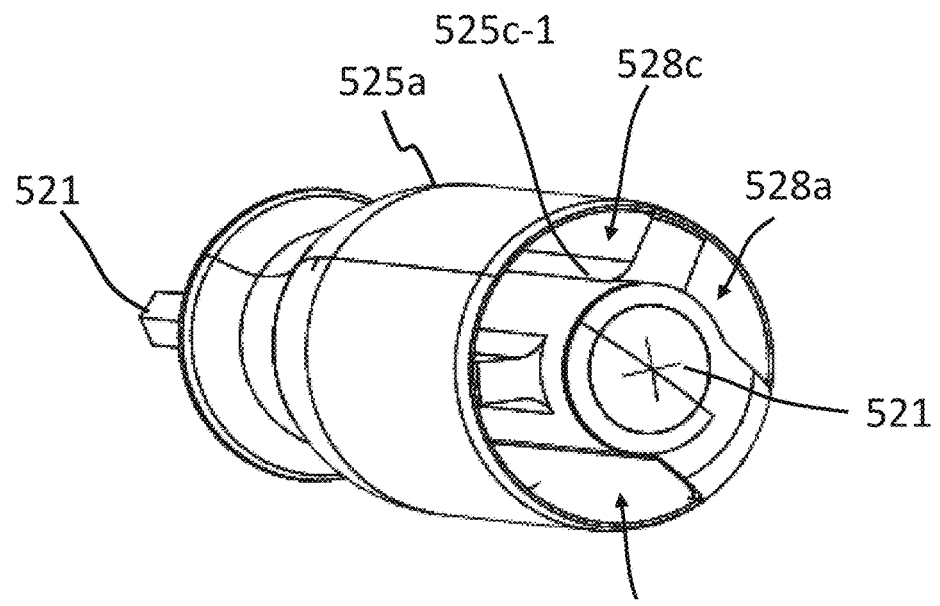
Figure 14C:
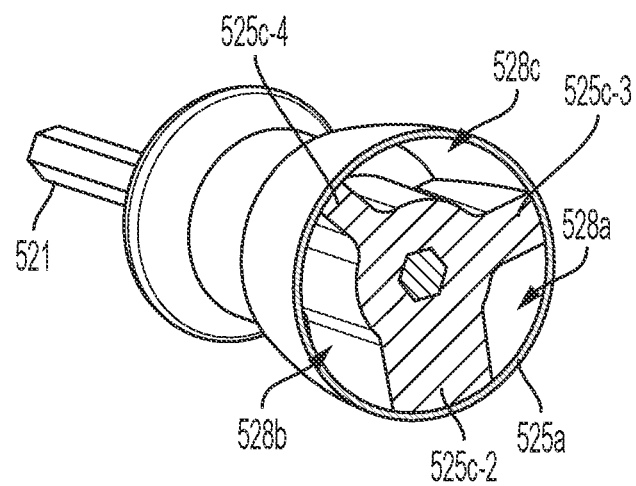
Figure 14D:
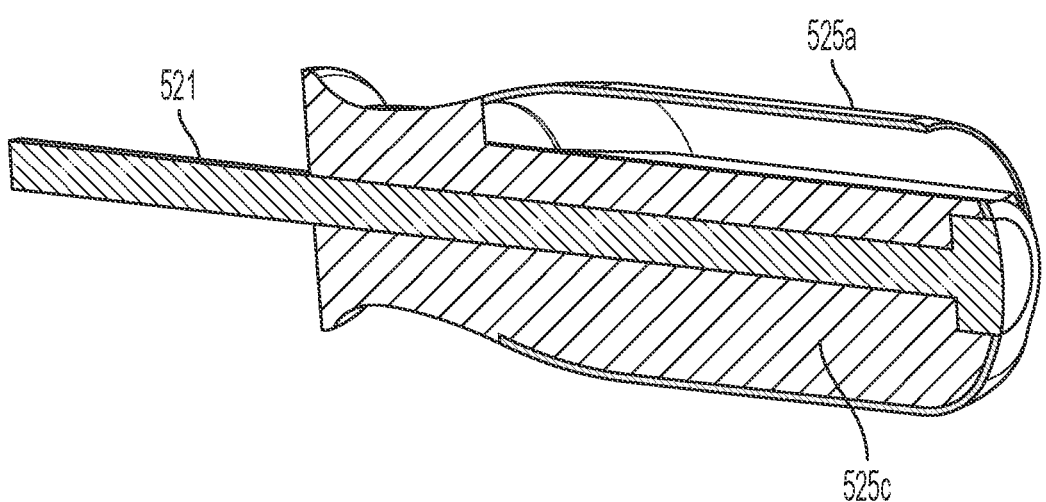

FIGS. 14A and 14B depict an example in which the external portion 525a has been formed from the first TPE or TPU material, and the second TPE or TPU material has not yet been used to form the first inner portion 525b. More specifically, FIGS. 14A and 14B depict a side view and perspective view, respectively, while FIGS. 14C and 14D depict sectional views of sections cut along the lines C-C and D-D, respectively. In this example, the shell formed by the external portion 525a may surround the shaft 521 and form a first cavity or a first set of cavities 528a-528c located between the shaft 521 and the shell. FIGS. 14A-14D further illustrates a handle 520 that includes the second inner portion 525c. In some cases, the second inner portion 525c may be formed around the handle 521 before the external portion 525a is formed around the handle 521. In the example of FIGS. 14A-14D, the plurality of wall portions 525c-2, 525c-3, 525c-4 may extend from the sleeve portion 525c-1 to the external portion 525a, such that the external portion 525a may be supported by the plurality of wall portions 525c-2, 525c-3, 525c-4. Further, the plurality of wall portions 525c-2, 525c-3, 525c-4 may divide a space between the external portion 525a and the shaft 521 into multiple cavities. More specifically, after the second inner portion 525c and the external portion 525a are formed (and before the second TPE or TPU material is used to form the first inner portion 525b), the external portion 525a may surround a space between the external portion 525a and the second inner portion 525c, and this space may be divided into the first set of cavities 528a-c by the plurality of wall portions 525c-2, 525c-3, 525c-4.

Figure 15A:
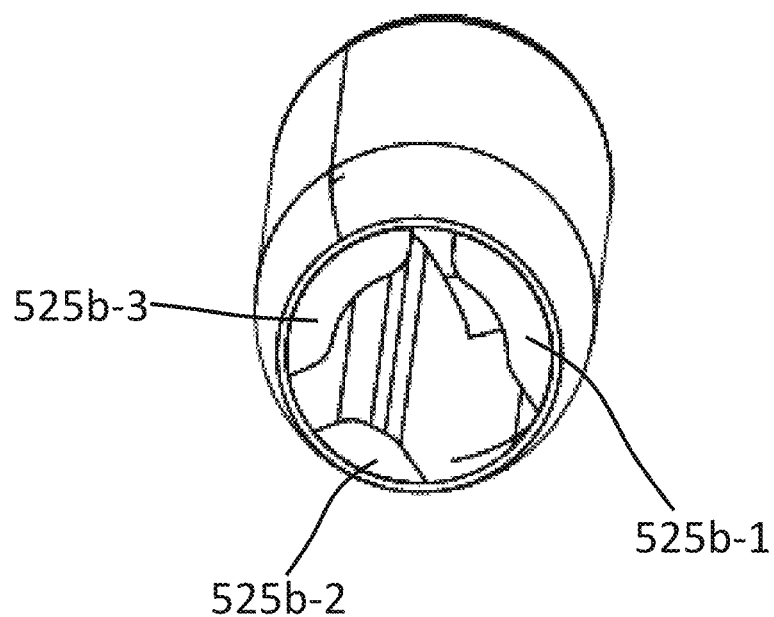
FIGS. 15A and 15B depict an external portion and a first inner portion of a grip component of a hand tool, according to an embodiment hereof.
Figure 15B:
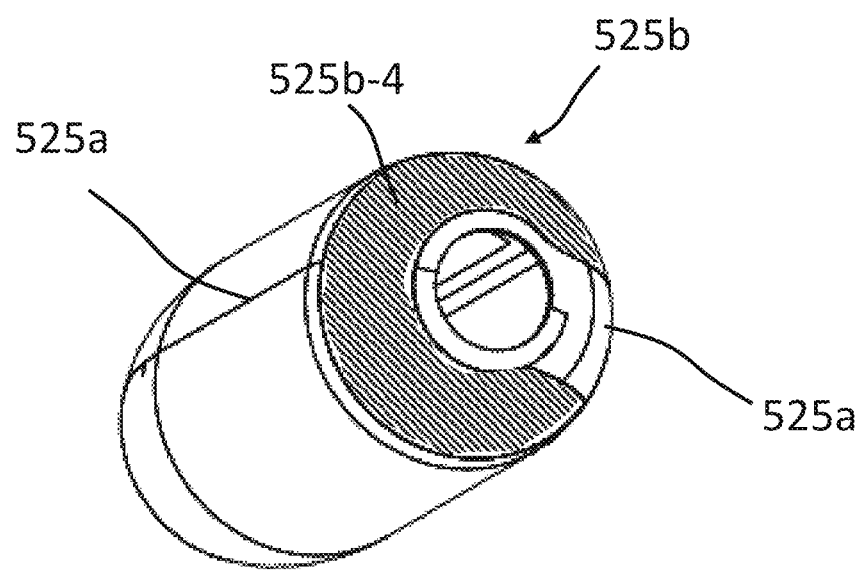

As stated above, the first inner portion 525b may be formed from the second TPE or TPU material after the external portion 525a is formed. In an embodiment, the second TPE or TPU material may be injected into the first set of cavities 528a-c discussed above to form respective sub-portions 525b-1 through 525b-3 of the first inner portion 525b. FIGS. 15A and 15B illustrate the three respective sub-portions 525b-1, 525b-2, 525b-3 that are part of the first inner portion 525b. More specifically, FIGS. 15A and 15B depict the grip component 525 after the external portion 525a and the first inner portion 525b has been formed. The first inner portion 525b may have been formed by injecting the second TPE and TPU material into the first set of cavities 528a-c to form the respective sub-portions 525b-1, 525b-2, 525b-3 of the first inner portion 525b. The first inner portion 525b may be at least partially surrounded by (also referred to as being covered by) the external portion 525a, and may be located between the shaft 521 and the external portion 525a. If the handle 520 includes the second inner portion 525c, the first inner portion 525b may be located between the external portion 525a and the second inner portion 525b.

Figure 16A:
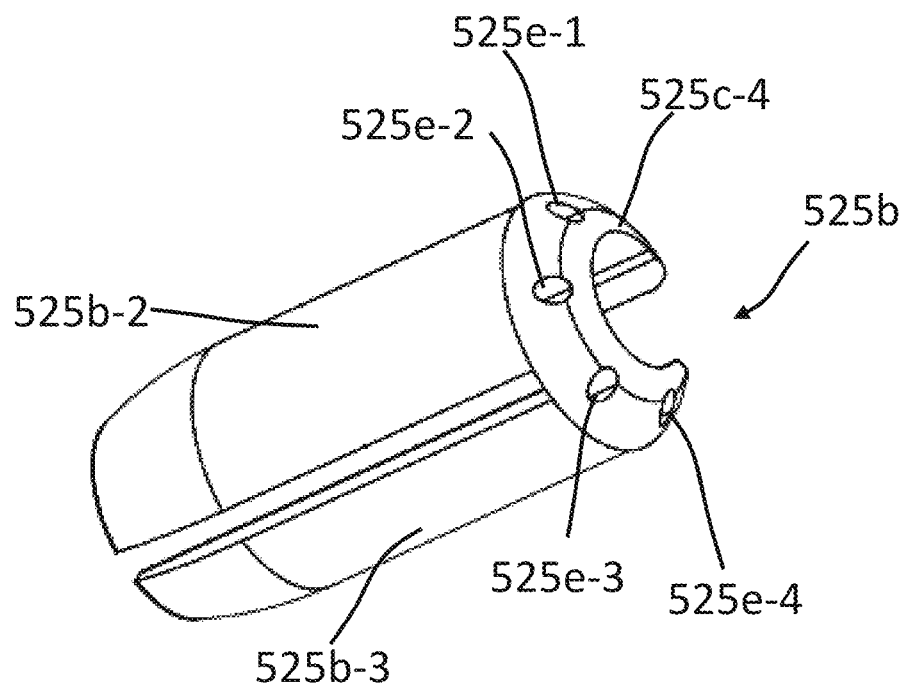
FIGS. 16A and 16B depict a first inner portion of a grip component of a hand tool, according to an embodiment hereof.
Figure 16B:
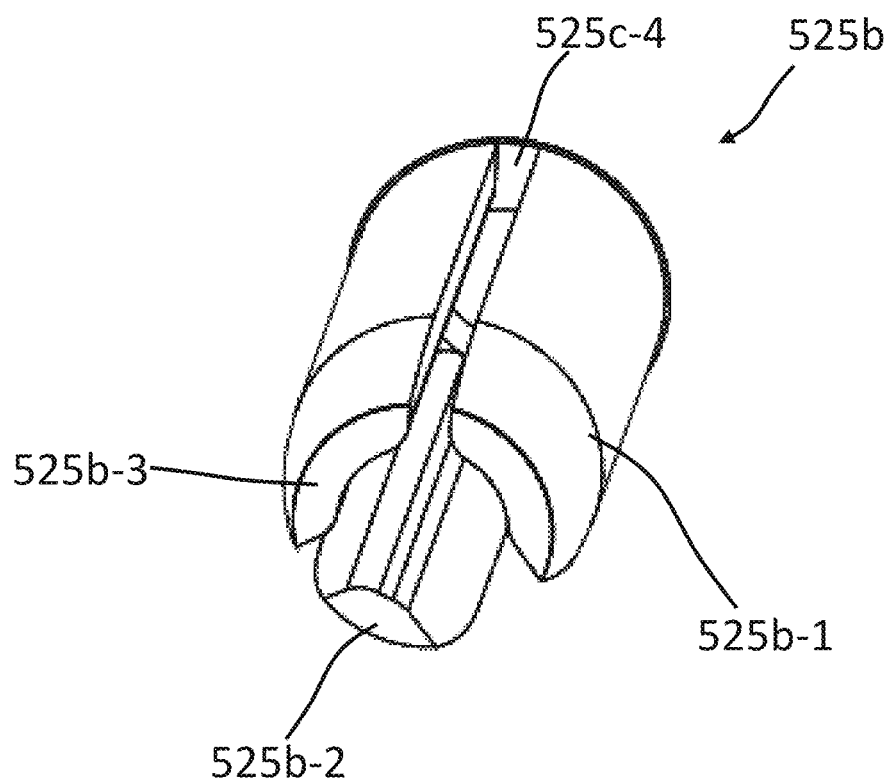

FIGS. 16A and 16B depicts specifically the first inner portion 525b. As the figures illustrate, the first inner portion 525b may include a first set of sub-portions 525b-1 through 525b-3 that are formed by injecting the second TPE or TPU material into the first set of cavities 5258a-c. As illustrated, the first inner portion 525b may further include a connecting sub-portion 525c-4 that connects the first set of sub-portions 525b-1. The connecting sub-portion 525c-4 may be located, e.g., at an end of the first inner portion 525b. In some cases, this end of the first inner portion 525b may also be the second end 504 of the hand tool. In some cases, the external portion 525a does not cover this end of the first inner portion 525b. For instance, this end of the first inner portion 525b may be exposed to user contact after the hand tool 500 is formed, while the remaining part of the first inner portion 525b is covered by the external portion 525a.

In an embodiment, when the second TPE or TPU material is being injected, it may flow directly onto the second inner portion 525c and/or directly onto the external portion 525a. In such cases, the second TPE or TPU material of the first inner portion 525b may be in direct contact with the second inner portion 525c and/or the external portion 525a, and there may be no adhesive between the first inner portion 525b and the second inner portion 525c, and no adhesive between the first inner portion 525b and the external portion 525a.

FIG. 16A further illustrates one or more cavities (as referred to as one or more voids) that are within the second TPE or TPU material forming the first inner portion 525b. More specifically, FIG. 16A illustrates a first plurality of cavities 525e-1 through 525e-4 that are within the first inner portion 525b. In some cases, each of the first plurality of cavities 525e-1 through 525e-4 may extend longitudinally within the first inner portion 525b. The hand tool 500 may be formed without injecting any material into the one or more cavities 525e-1 through 525e-4, which may at most have air within them after the hand tool 500 is formed. In an embodiment, one or more cavities may instead or additionally be formed in the first TPE or TPU material of the external portion 525a. The one or more cavities provide increased deformability of the first inner portion 525b and/or of the external portion 525a. When a user is gripping the hand tool 500 with a high level of force, the increased deformability may enhance comfort and/or improve an ability for torque to be transferred from the user to the shaft 521.

Figure 17A:
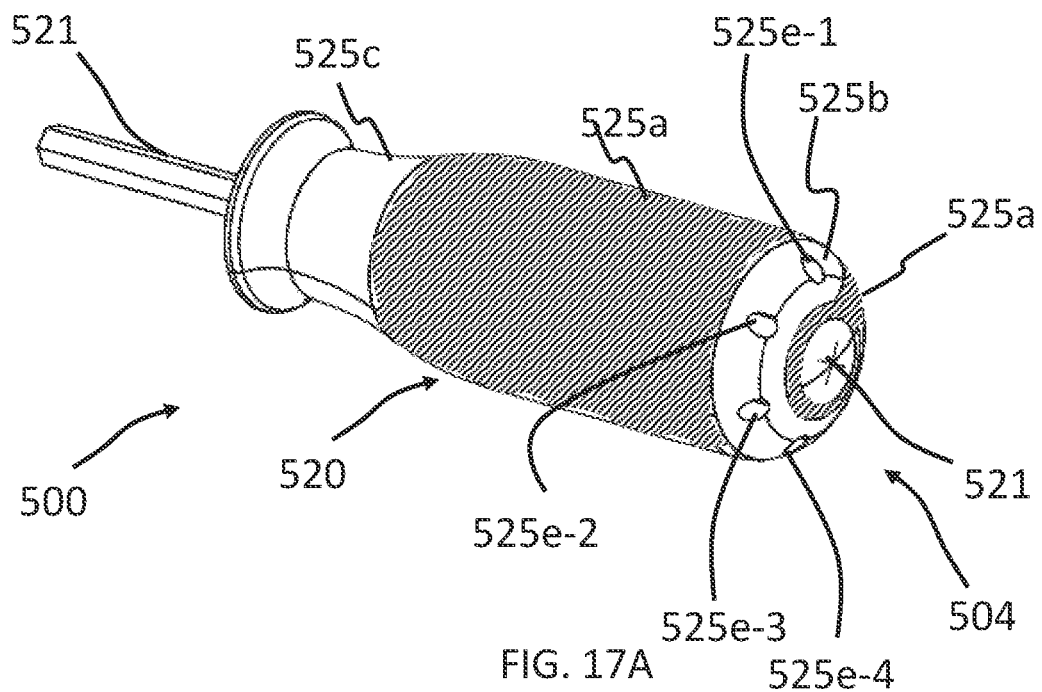
FIGS. 17A, 17B, and 17C depict portions of a handle of a hand tool, according to an embodiment hereof.
Figure 17B:
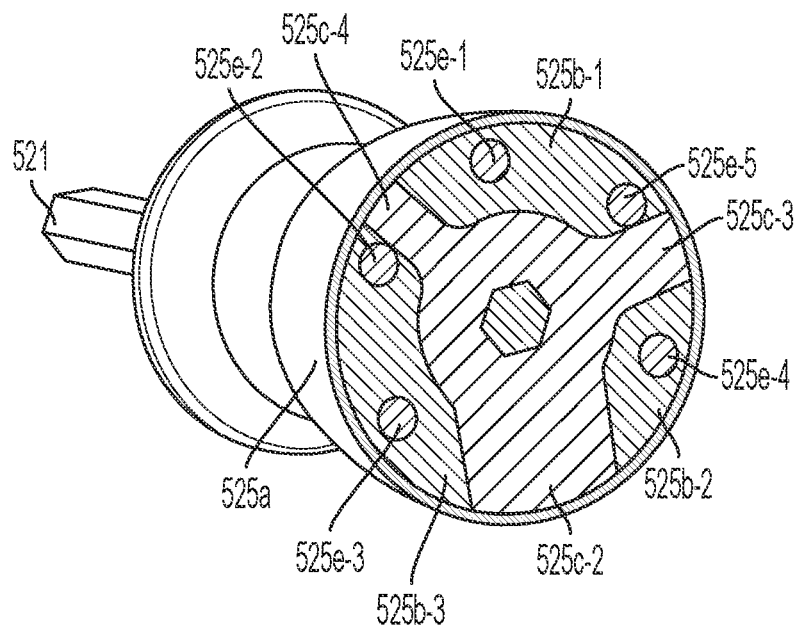
Figure 17C:
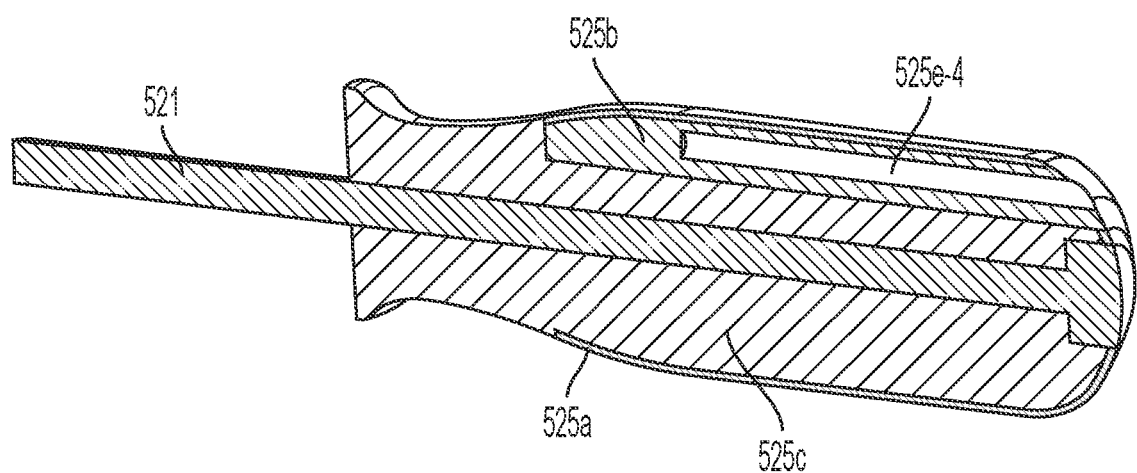

FIGS. 17A-17C illustrate the hand tool 500 after it is formed. More specifically, FIG. 17A depicts a perspective view of the hand tool 500, while FIGS. 17B and 17C illustrate sectional views of the hand tool 500. FIG. 17A depicts the shaft 521 and the handle 520 having a reverse-molded grip component 525 which includes an external portion 525a that partially surrounds a first inner portion 525b. In this embodiment, the first inner portion 525b may be exposed to user contact, or more generally is not covered by the external portion 525a, at the second end 504 of the hand tool 500. As depicted in FIG. 17B, the external portion 525a and the walls of the second inner portion 525c may divide the first inner portion 525a into multiple chambers that are spaced at different increments circumferentially. The multiple chambers may correspond to the multiple sub-portions 525b-1 through 525b-3 and to the multiple cavities 528a-c. As depicted in FIGS. 17B and 17C, the first inner portion 525b may have cavities (also referred to as voids) 525e-1 through 525e-5 in the second TPE or TPU material of the first inner portion 525b, as discussed above.

In an embodiment, the harder material of the external portion 525a (relative to the first inner portion 525b) may allow the grip component 525 to have an outside shape that is optimized for control and precision when a low force is being used to grip the grip component 525. The softer material of the first inner portion 525b and/or the cavities 525e-1 through 525e-5 may allow the outside shape of the grip component to change when a high force is being used to grip the grip component 525, wherein the shape change may facilitate better torque transfer.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

What is claimed is:

1. A hand tool, comprising:
    a shaft forming a driving bit at a first end of the hand tool, or having a bit-receiving socket at a first end of the hand tool; and
    a grip component disposed around the shaft at a second and opposite end of the hand tool, wherein the grip component and the shaft form a handle of the hand tool, wherein the grip component has: an external portion formed from a first thermoplastic elastomer (TPE) material or thermoplastic urethane (TPU) material, a first inner portion formed from a second TPE or TPU material having a lower level of hardness relative to the first TPE or TPU material, and a second inner portion disposed between the shaft and the first inner portion,
    wherein the second inner portion has a sleeve portion that is in direct contact with the shaft and extends along a longitudinal axis of the shaft,
    wherein the second inner portion has a plurality of wall portions that extend from the sleeve portion to the external portion of the grip component,
    wherein the grip component is a reverse-molded component formed by:
    forming the external portion of the grip component by molding the first thermoplastic elastomer (TPE) material or thermoplastic urethane (TPU) material into a shell that surrounds the shaft and forms a first set of cavities located between the shaft and the shell;
    after the external portion of the grip component is formed, forming the first inner portion by injecting the second TPE or TPU material into the first set of cavities, wherein the first inner portion is located between the external portion and the shaft,
    wherein the external portion is formed after the second inner portion is formed, and wherein, after the external portion is formed and before the first inner portion is formed, the external portion surrounds a space between the external portion and the second inner portion, and wherein the space is divided into the first set of cavities by the plurality of wall portions of the second inner portion,
    wherein the first inner portion includes a plurality of sub-portions that are formed by injecting the second TPE or TPU material into the first set of cavities, respectively, and
    wherein the first inner portion further includes a connection sub-portion disposed at the second end of the hand tool, wherein the connecting sub-portion connects the plurality of sub-portions that were formed in the first set of cavities.

2. The hand tool of claim 1, wherein the second inner portion is formed from a material that is harder than the first TPE or TPU material.

3. The hand tool of claim 1, wherein the external portion is an exposed user contact surface for the grip component.

4. The hand tool of claim 1, wherein a thickness of the first inner portion is greater than a thickness of the external portion.

5. The hand tool of claim 1, wherein the second TPE or TPU material has a durometer that is in a range of shore 00-10 to shore 00-30.

6. The hand tool of claim 1, wherein, after the hand tool is formed, the first inner portion has one or more cavities within the second TPE or TPU material thereof.

7. The hand tool of claim 1, wherein the first inner portion is not covered by the external portion at the second end of the hand tool.

8. A hand tool, comprising:
    a shaft forming a driving bit at a first end of the hand tool, or having a bit-receiving socket at a first end of the hand tool; and
    a grip component disposed around the shaft at a second and opposite end of the hand tool, wherein the grip component and the shaft form a handle of the hand tool, wherein the grip component has: an external portion formed from a first thermoplastic elastomer (TPE) material or thermoplastic urethane (TPU) material and has a first inner portion formed from a second TPE or TPU material having a lower level of hardness relative to the first TPE or TPU material,
    wherein the grip component is a reverse-molded component formed by:
    forming the external portion of the grip component by molding the first thermoplastic elastomer (TPE) material or thermoplastic urethane (TPU) material into a shell that surrounds the shaft and forms a first cavity located between the shaft and the shell;
    after the external portion of the grip component is formed, forming the first inner portion by injecting the second TPE or TPU material into the first cavity, wherein the first inner portion is located between the external portion and the shaft, and wherein, after the hand tool is formed, the first inner portion has one or more cavities within the second TPE or TPU material thereof.

9. The hand tool of claim 8, wherein each cavity of the one or more cavities extends along a longitudinal axis of the shaft.

10. The hand tool of claim 8, wherein the external portion is an exposed user contact surface for the grip component.

11. The hand tool of claim 8, wherein a thickness of the first inner portion is greater than a thickness of the external portion.

12. The hand tool of claim 8, wherein the second TPE or TPU material has a durometer that is in a range of shore 00-10 to shore 00-30.

13. The hand tool of claim 8, wherein the first inner portion is not covered by the external portion at the second end of the hand tool.

14. A hand tool, comprising:
a shaft forming a driving bit at a first end of the hand tool, or having a bit-receiving socket at a first end of the hand tool; and
a grip component disposed around the shaft at a second and opposite end of the hand tool, wherein the grip component and the shaft form a handle of the hand tool, wherein the grip component has: an external portion formed from a first thermoplastic elastomer (TPE) material or thermoplastic urethane (TPU) material and has a first inner portion formed from a second TPE or TPU material having a lower level of hardness relative to the first TPE or TPU material,
wherein the grip component is a reverse-molded component formed by:
forming the external portion of the grip component by molding the first thermoplastic elastomer (TPE) material or thermoplastic urethane (TPU) material into a shell that surrounds the shaft and forms a first cavity located between the shaft and the shell;
after the external portion of the grip component is formed, forming the first inner portion by injecting the second TPE or TPU material into the first cavity, wherein the first inner portion is located between the external portion and the shaft, and
wherein the first inner portion is not covered by the external portion at the second end of the hand tool.

15. The hand tool of claim 14, wherein, after the hand tool is formed, the first inner portion has one or more cavities within the second TPE or TPU material thereof.

16. The hand tool of claim 14, wherein the external portion is an exposed user contact surface for the grip component.

17. The hand tool of claim 14, wherein a thickness of the first inner portion is greater than a thickness of the external portion.

18. The hand tool of claim 14, wherein the second TPE or TPU material has a durometer that is in a range of shore 00-10 to shore 00-30.

* * * * *